United States Patent
Yang et al.

(10) Patent No.: US 11,641,664 B2
(45) Date of Patent: May 2, 2023

(54) SIDELINK FEEDBACK CHANNEL REPETITIONS

(71) Applicant: QUALCOMM Incorporated, San Diego, CA (US)

(72) Inventors: Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 17/179,203

(22) Filed: Feb. 18, 2021

(65) Prior Publication Data
US 2022/0264585 A1    Aug. 18, 2022

(51) Int. Cl.
*H04W 72/10*     (2009.01)
*H04L 1/1812*    (2023.01)
*H04W 72/0446*   (2023.01)

(52) U.S. Cl.
CPC ........... *H04W 72/10* (2013.01); *H04L 1/1812* (2013.01); *H04W 72/0446* (2013.01)

(58) Field of Classification Search
CPC ........................ H04W 72/10; H04W 72/0446; H04L 1/1812; H04L 1/189; H04L 1/1893; H04L 5/0055; H04L 1/1861
See application file for complete search history.

(56) References Cited

U.S. PATENT DOCUMENTS

2021/0400681 A1*  12/2021  Wang ................... H04L 5/0053

FOREIGN PATENT DOCUMENTS

CN       112399579 A  *  2/2021
WO    WO-2021031961 A1 *  2/2021

OTHER PUBLICATIONS

Fujitsu: "Discussion on Physical Layer Structure for NR Sidelink", 3GPP TSG RAN WG1 Ad-Hoc Meeting 1901, 3GPP Draft, R1-1900247 Discussion On Sidelink Physical Layer Structure For NR Sidelink_FINAL, 3rd Generation Partnership Project (3GPP), Mobile Competence Centre, 650, Route Des Lucioles, F-06921 So, vol. RAN WG1, No. Taipei, Taiwan, Jan. 21, 2019-Jan. 25, 2019, Jan. 20, 2019 (Jan. 20, 2019), pp. 1-6, XP051593162, Retrieved from the Internet: URL: http://www.3gpp.org/ftp/Meetings%5F3GPP%5FSYNC/RAN1/Docs/R1%2D1900247%2Ezip [retrieved on Jan. 20, 2019], section 2.1-2.3, section 2.4.
International Search Report and Written Opinion—PCT/US2022/070115—ISA/EPO—dated Apr. 11, 2022.

(Continued)

*Primary Examiner* — Vinncelas Louis
(74) *Attorney, Agent, or Firm* — Harrity & Harrity, LLP

(57) ABSTRACT

Various aspects of the present disclosure generally relate to wireless communication. In some aspects, a first user equipment (UE) may send, to a second UE, a first physical sidelink shared channel (PSSCH) transmission. The first UE may select, for a second PSSCH transmission, a PSSCH resource for which a corresponding physical sidelink feedback channel (PSFCH) resource does not collide with one of a plurality of PSFCH transmissions in accordance with a repetition factor associated with the first PSSCH transmission. The first UE may send, to the second UE, the second PSSCH transmission via the PSSCH resource. Numerous other aspects are described.

30 Claims, 18 Drawing Sheets

(56) References Cited

OTHER PUBLICATIONS

LG Electronics: "Discussion on Physical Layer Procedures for NR Sidelink", 3GPP TSG RAN WG1 Meeting #99, 3GPP Draft, R1-1913237, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 13, 2019 (Nov. 13, 2019), 20 Pages, XP051824916, Retrieved from the Internet: URL: https://ftp.3gpp.org/tsg_ran/WG1_RL1/TSGR1_99/Docs/R1-1913237.zip R1-1913237 Discussion on physical layer procedure for NR sidelink.docx [retrieved on Nov. 13, 2019] section 2.2.

Panasonic: "Discussion on Physical Layer Procedures for Sidelink in NR V2X",3GPP TSG RAN WG1 #97, 3GPP Draft, R1-1906404, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, pp. 1-4, May 13, 2019 (May 13, 2019), XP051727854, Retrieved from the Internet: URL: http://www.3gpp.org/ftp/Meetings%5F3GP%5FSYNC/RAN1/Docs/R1%2D1906404%2Ezip [retrieved on May 13, 2019] section 2.1.

\* cited by examiner

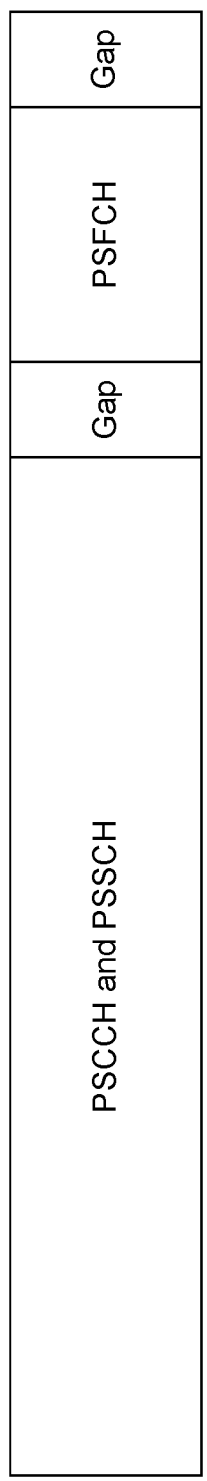
FIG. 5

SIDELINK FEEDBACK CHANNEL REPETITIONS

FIELD OF THE DISCLOSURE

Aspects of the present disclosure generally relate to wireless communication and to techniques and apparatuses for sidelink feedback channel repetitions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first UE includes receiving, from a second UE, a sidelink communication via a sidelink channel between the first UE and the second UE; and transmitting, to the second UE and based at least in part on the sidelink communication, a physical sidelink feedback channel (PSFCH) with a quantity of repetitions.

In some aspects, a method of wireless communication performed by a first UE includes transmitting, to a second UE, a sidelink communication via a sidelink channel between the first UE and the second UE; and receiving, from the second UE and based at least in part on the sidelink communication, a PSFCH with a quantity of repetitions.

In some aspects, a first UE for wireless communication includes a memory and one or more processors operatively coupled to the memory, the memory and the one or more processors configured to: receiving, from a second UE, a sidelink communication via a sidelink channel between the first UE and the second UE; and transmitting, to the second UE and based at least in part on the sidelink communication, a PSFCH with a quantity of repetitions.

In some aspects, a first UE for wireless communication includes a memory and one or more processors operatively coupled to the memory, the memory and the one or more processors configured to: transmit, to a second UE, a sidelink communication via a sidelink channel between the first UE and the second UE; and receive, from the second UE and based at least in part on the sidelink communication, a PSFCH with a quantity of repetitions.

In some aspects, a method of wireless communication performed by a first UE includes sending, to a second UE, a first physical sidelink shared channel (PSSCH) transmission; selecting, for a second PSSCH transmission, a PSSCH resource for which a corresponding PSFCH resource does not collide with one of a plurality of PSFCH transmissions in accordance with a repetition factor associated with the first PSSCH transmission; and sending, to the second UE, the second PSSCH transmission via the PSSCH resource.

In some aspects, a method of wireless communication performed by a first UE includes receiving, from a second UE, a first PSSCH transmission; and receiving, from the second UE, a second PSSCH transmission via a PSSCH resource for which a corresponding PSFCH resource does not collide with one of a plurality of PSFCH transmissions in accordance with a repetition factor based at least in part on the first PSSCH transmission.

In some aspects, a first UE for wireless communication includes a memory and one or more processors operatively coupled to the memory, the memory and the one or more processors configured to: send, to a second UE, a first PSSCH transmission; select, for a second PSSCH transmission, a PSSCH resource for which a corresponding PSFCH resource does not collide with one of a plurality of PSFCH transmissions in accordance with a repetition factor associated with the first PSSCH transmission; and send, to the second UE, the second PSSCH transmission via the PSSCH resource.

In some aspects, a first UE for wireless communication includes a memory and one or more processors operatively coupled to the memory, the memory and the one or more processors configured to: receive, from a second UE, a first PSSCH transmission; and receive, from the second UE, a second PSSCH transmission via a PSSCH resource for which a corresponding PSFCH resource does not collide with one of a plurality of PSFCH transmissions in accordance with a repetition factor based at least in part on the first PSSCH transmission.

In some aspects, a non-transitory computer-readable medium storing a set of instructions for wireless communication includes one or more instructions that, when executed by one or more processors of a first UE, cause the first UE to: receive, from a second UE, a sidelink communication via a sidelink channel between the first UE and the second UE; and transmit, to the second UE and based at least in part on the sidelink communication, a PSFCH with a quantity of repetitions.

In some aspects, a non-transitory computer-readable medium storing a set of instructions for wireless communication includes one or more instructions that, when executed by one or more processors of a first UE, cause the first UE to: transmit, to a second UE, a sidelink communication via a sidelink channel between the first UE and the second UE; and receive, from the second UE and based at least in part on the sidelink communication, a PSFCH with a quantity of repetitions.

In some aspects, a non-transitory computer-readable medium storing a set of instructions for wireless communication includes one or more instructions that, when executed by one or more processors of a first UE, cause the first UE to: send, to a second UE, a first PSSCH transmission; select, for a second PSSCH transmission, a PSSCH resource for which a corresponding PSFCH resource does not collide with one of a plurality of PSFCH transmissions in accordance with a repetition factor associated with the first PSSCH transmission; and send, to the second UE, the second PSSCH transmission via the PSSCH resource.

In some aspects, a non-transitory computer-readable medium storing a set of instructions for wireless communication includes one or more instructions that, when executed by one or more processors of a first UE, cause the first UE to: receive, from a second UE, a first PSSCH transmission; and receive, from the second UE, a second PSSCH transmission via a PSSCH resource for which a corresponding PSFCH resource does not collide with one of a plurality of PSFCH transmissions in accordance with a repetition factor based at least in part on the first PSSCH transmission.

In some aspects, a first apparatus for wireless communication includes means for receiving, from a second apparatus, a sidelink communication via a sidelink channel between the first apparatus and the second apparatus; and means for transmitting, to the second apparatus and based at least in part on the sidelink communication, a PSFCH with a quantity of repetitions.

In some aspects, a first apparatus for wireless communication includes means for transmitting, to a second apparatus, a sidelink communication via a sidelink channel between the first apparatus and the second apparatus; and means for receiving, from the second apparatus and based at least in part on the sidelink communication, a PSFCH with a quantity of repetitions.

In some aspects, a first apparatus for wireless communication includes means for sending, to a second apparatus, a first PSSCH transmission; means for selecting, for a second PSSCH transmission, a PSSCH resource for which a corresponding PSFCH resource does not collide with one of a plurality of PSFCH transmissions in accordance with a repetition factor associated with the first PSSCH transmission; and means for sending, to the second apparatus, the second PSSCH transmission via the PSSCH resource.

In some aspects, a first apparatus for wireless communication includes means for receiving, from a second apparatus, a first PSSCH transmission; and means for receiving, from the second apparatus, a second PSSCH transmission via a PSSCH resource for which a corresponding PSFCH resource does not collide with one of a plurality of PSFCH transmissions in accordance with a repetition factor based at least in part on the first PSSCH transmission.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of sidelink channels, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
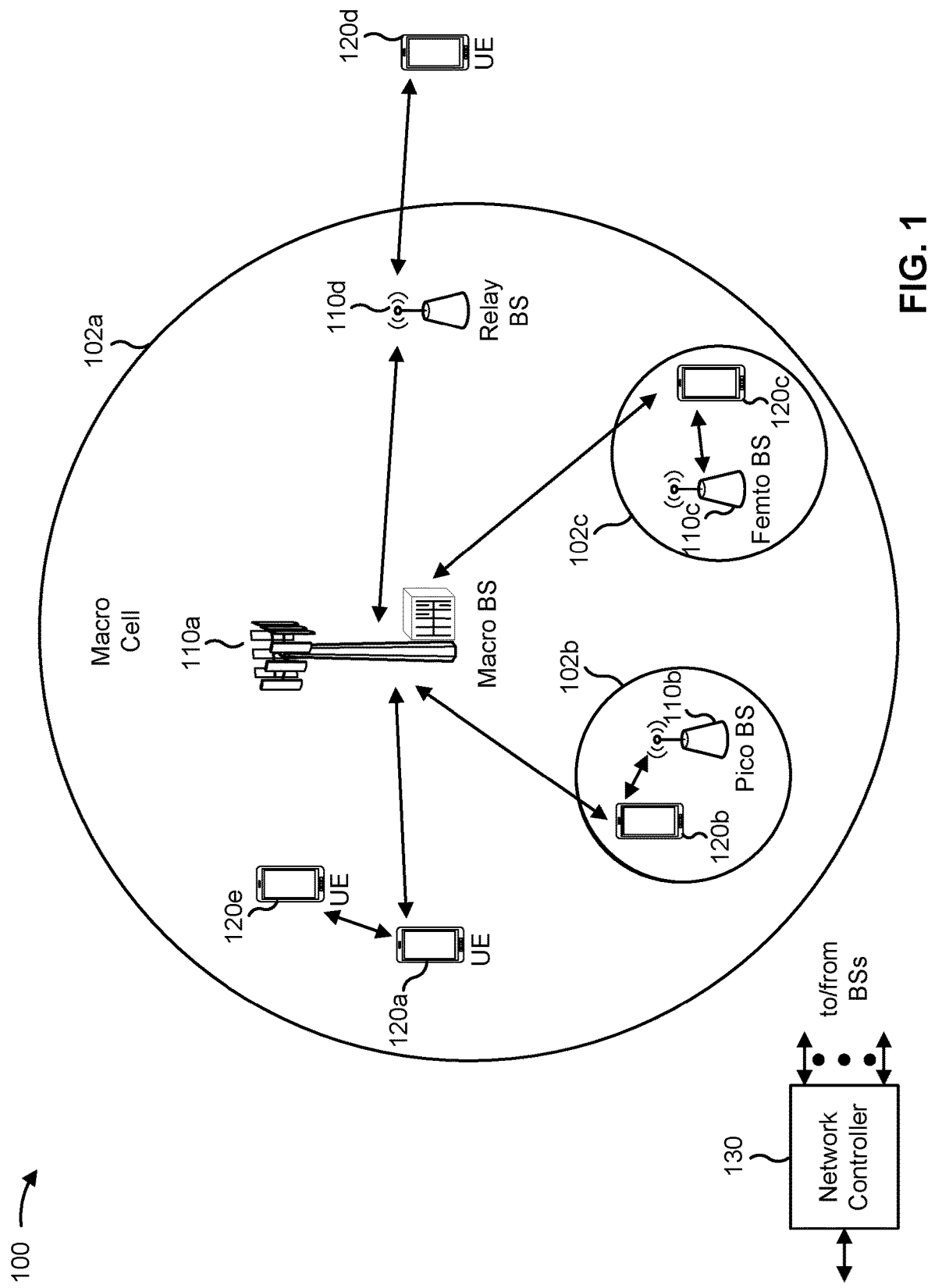
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
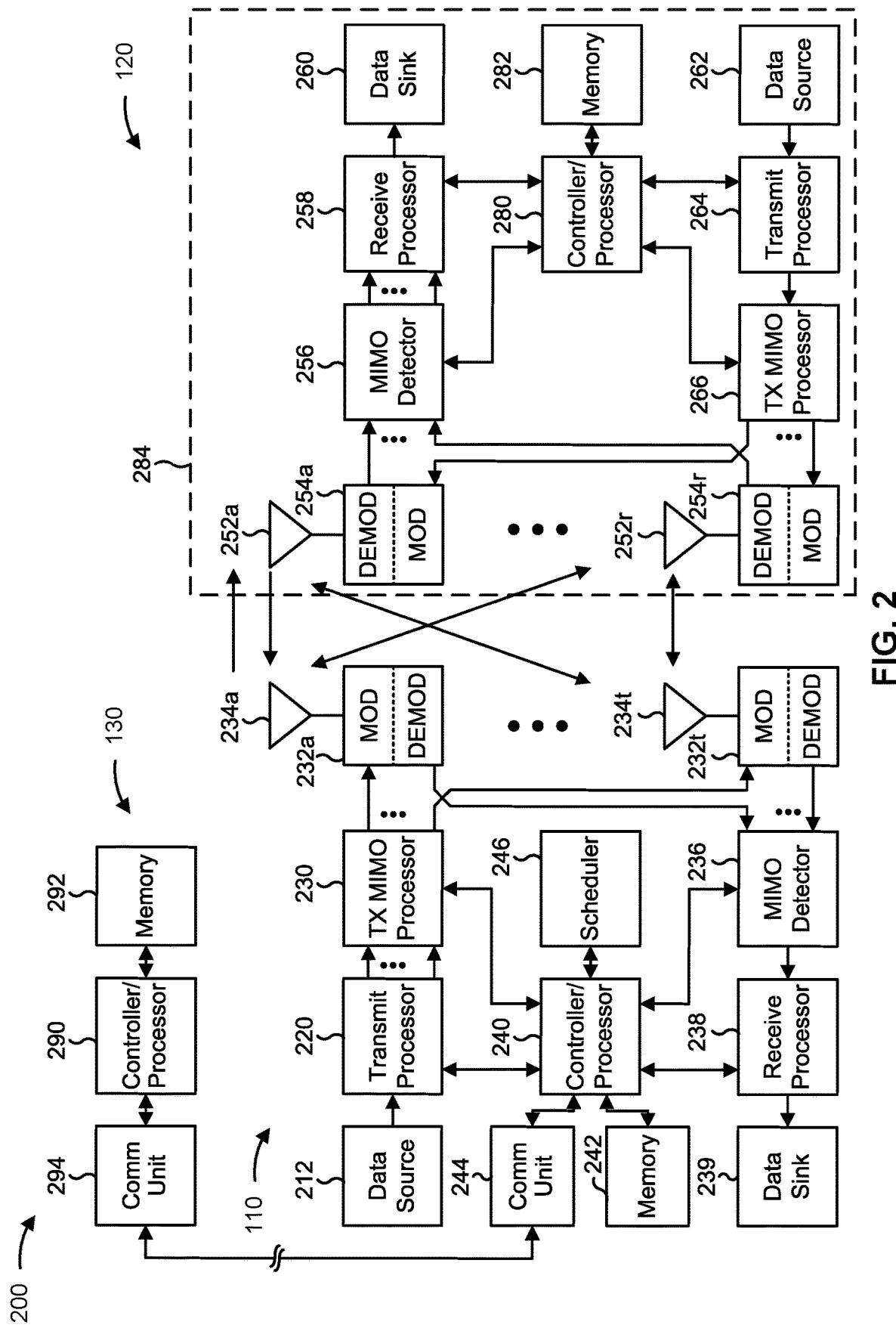
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 8-17.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 8-17.

Controller/processor 240 of base station 110, controller/processor 280 of UE 120, and/or any other component(s) of FIG. 2 may perform one or more techniques associated with sidelink feedback channel repetitions, as described in more detail elsewhere herein. For example, controller/processor 240 of base station 110, controller/processor 280 of UE 120, and/or any other component(s) of FIG. 2 may perform or direct operations of, for example, process 1400 of FIG. 14, process 1500 of FIG. 15, process 1600 of FIG. 16, process 1700 of FIG. 17, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1400 of FIG. 14, process 1500 of FIG. 15, process 1600 of FIG. 16, process 1700 of FIG. 17, and/or other processes as described herein. In some aspects, executing instructions may include running the instructions, converting the instructions, compiling the instructions, and/or interpreting the instructions, among other examples.

In some aspects, a first UE (e.g., UE 120a) includes means for receiving, from a second UE (e.g., UE 120e), a sidelink communication via a sidelink channel between the first UE and the second UE; and/or means for transmitting, to the second UE and based at least in part on the sidelink communication, a PSFCH with a quantity of repetitions. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for determining the quantity of repetitions based at least in part on a number of information bits carried in the PSFCH.

In some aspects, the first UE includes means for determining a configuration for a plurality of thresholds; and determining the quantity of repetitions based at least in part on the plurality of thresholds.

In some aspects, the first UE includes means for receiving, from the second UE, sidelink control information that indicates the quantity of repetitions, wherein the sidelink control information is associated with a scheduling of the sidelink communication via the sidelink channel.

In some aspects, the first UE includes means for determining a configuration that indicates a periodicity associated with PSFCH transmissions and the quantity of repetitions.

In some aspects, the first UE includes means for transmitting, to a second UE, a sidelink communication via a sidelink channel between the first UE and the second UE; and/or means for receiving, from the second UE and based at least in part on the sidelink communication, a PSFCH with a quantity of repetitions.

In some aspects, the first UE includes means for transmitting, to the second UE, sidelink control information that indicates the quantity of repetitions, wherein the sidelink control information is associated with a scheduling of the sidelink communication via the sidelink channel.

In some aspects, the first UE includes means for sending, to a second UE, a first PSSCH transmission; means for selecting, for a second PSSCH transmission, a PSSCH resource for which a corresponding PSFCH resource does not collide with one of a plurality of PSFCH transmissions in accordance with a repetition factor associated with the first PSSCH transmission; and/or means for sending, to the second UE, the second PSSCH transmission via the PSSCH resource.

In some aspects, the first UE includes means for receiving, from the second UE, the plurality of PSFCH transmissions in accordance with the repetition factor based at least in part on the first PSSCH transmission.

In some aspects, the first UE includes means for sending, to the second UE, the second PSSCH transmission based at least in part on receiving the plurality of PSFCH transmissions in accordance with the repetition factor from the second UE.

In some aspects, the first UE includes means for sending, to the second UE, the second PSSCH transmission associated with a second resource pool irrespective of whether a plurality of PSFCH transmissions in accordance with a repetition factor are received from the second UE based at least in part on the first PSSCH transmission.

In some aspects, the first UE includes means for receiving, from a second UE, a first PSSCH transmission; and/or means for receiving, from the second UE, a second PSSCH transmission via a PSSCH resource for which a corresponding PSFCH resource does not collide with one of a plurality of PSFCH transmissions in accordance with a repetition factor based at least in part on the first PSSCH transmission.

In some aspects, the first UE includes means for transmitting, to the second UE, the plurality of PSFCH transmissions in accordance with the repetition factor based at least in part on the first PSSCH transmission.

In some aspects, the first UE includes means for receiving, from the second UE, the second PSSCH transmission based at least in part on transmitting the plurality of PSFCH transmissions in accordance with the repetition factor to the second UE.

In some aspects, the first UE includes means for receiving, from the second UE, the second PSSCH transmission associated with a second resource pool irrespective of whether a plurality of PSFCH transmissions in accordance with a repetition factor are transmitted to the second UE based at least in part on the first PSSCH transmission.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
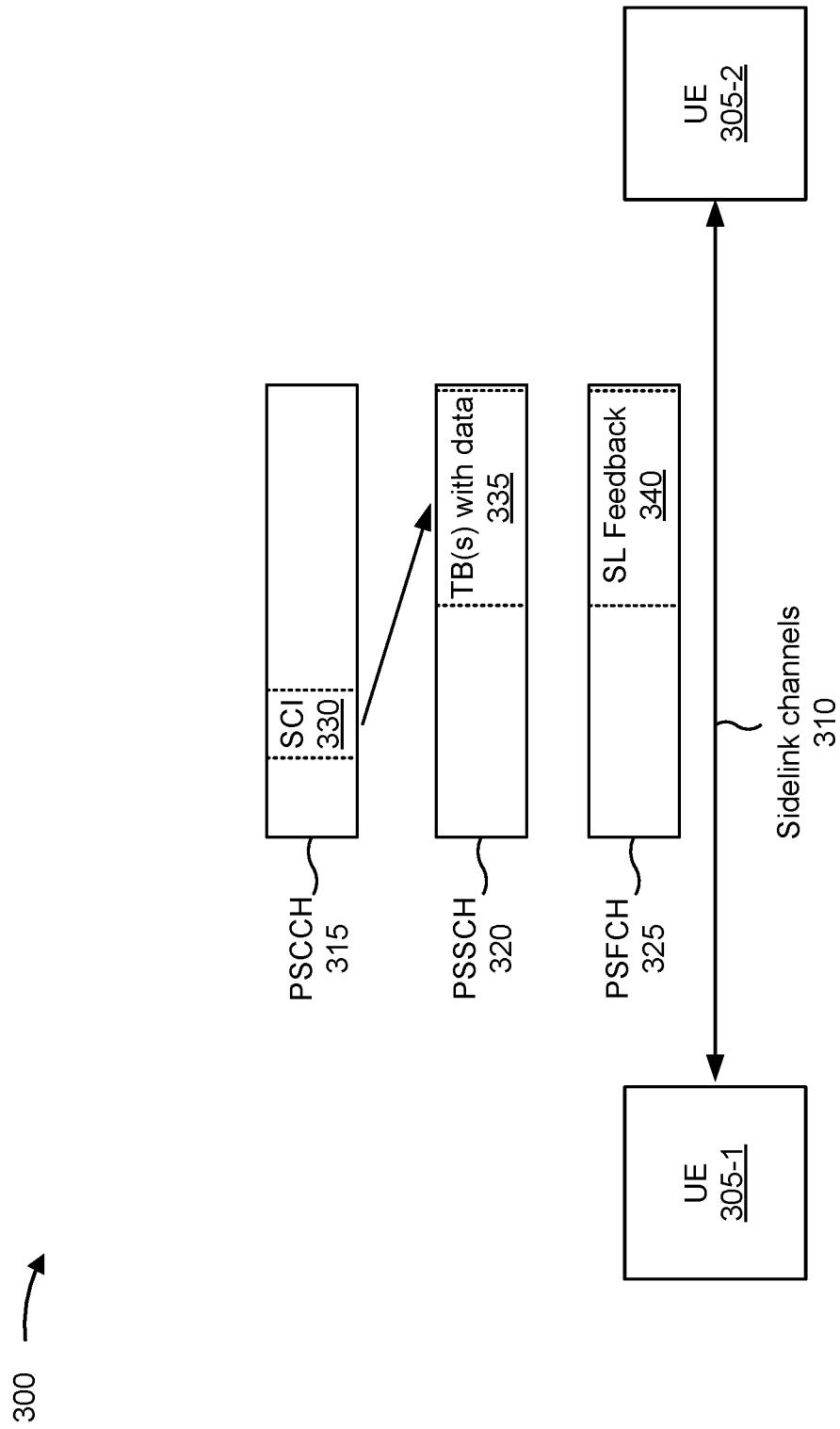
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-person (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a PSSCH 320, and/or a PSFCH 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
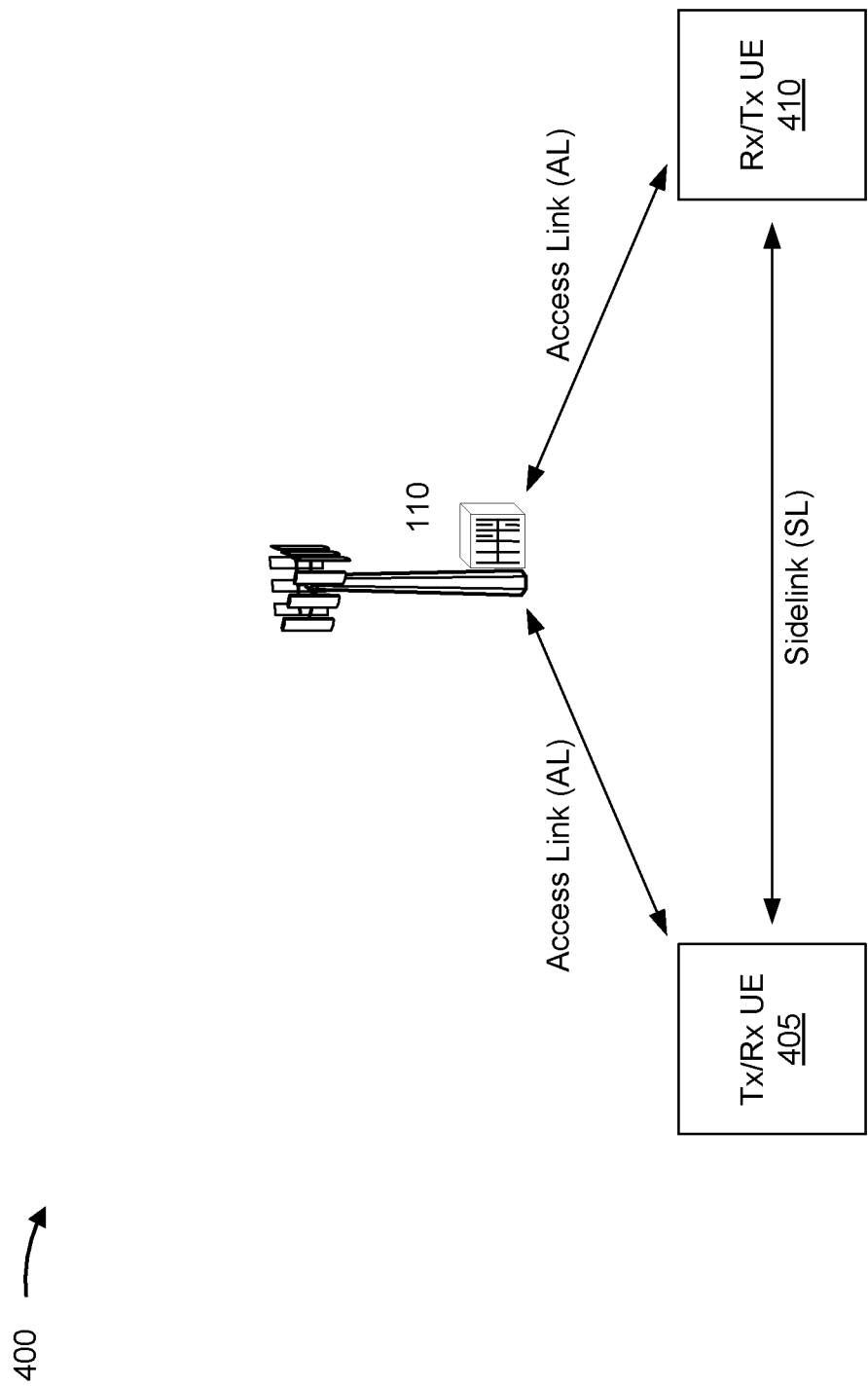
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

FIG. 5 is a diagram illustrating an example 500 of sidelink channels, in accordance with the present disclosure.

As shown in FIG. 5, a PSCCH and a PSSCH may be associated with a plurality of resources in a time domain and a frequency domain. A PSFCH may be associated with a plurality of resources in the time domain and the frequency domain. The PSCCH and the PSSCH may not be separated by a gap. The PSCCH and the PSSCH may be separated by a gap with the PSFCH.

As indicated above, FIG. 5 is provided as an example. Other examples may differ from what is described with regard to FIG. 5.

Figure 6:
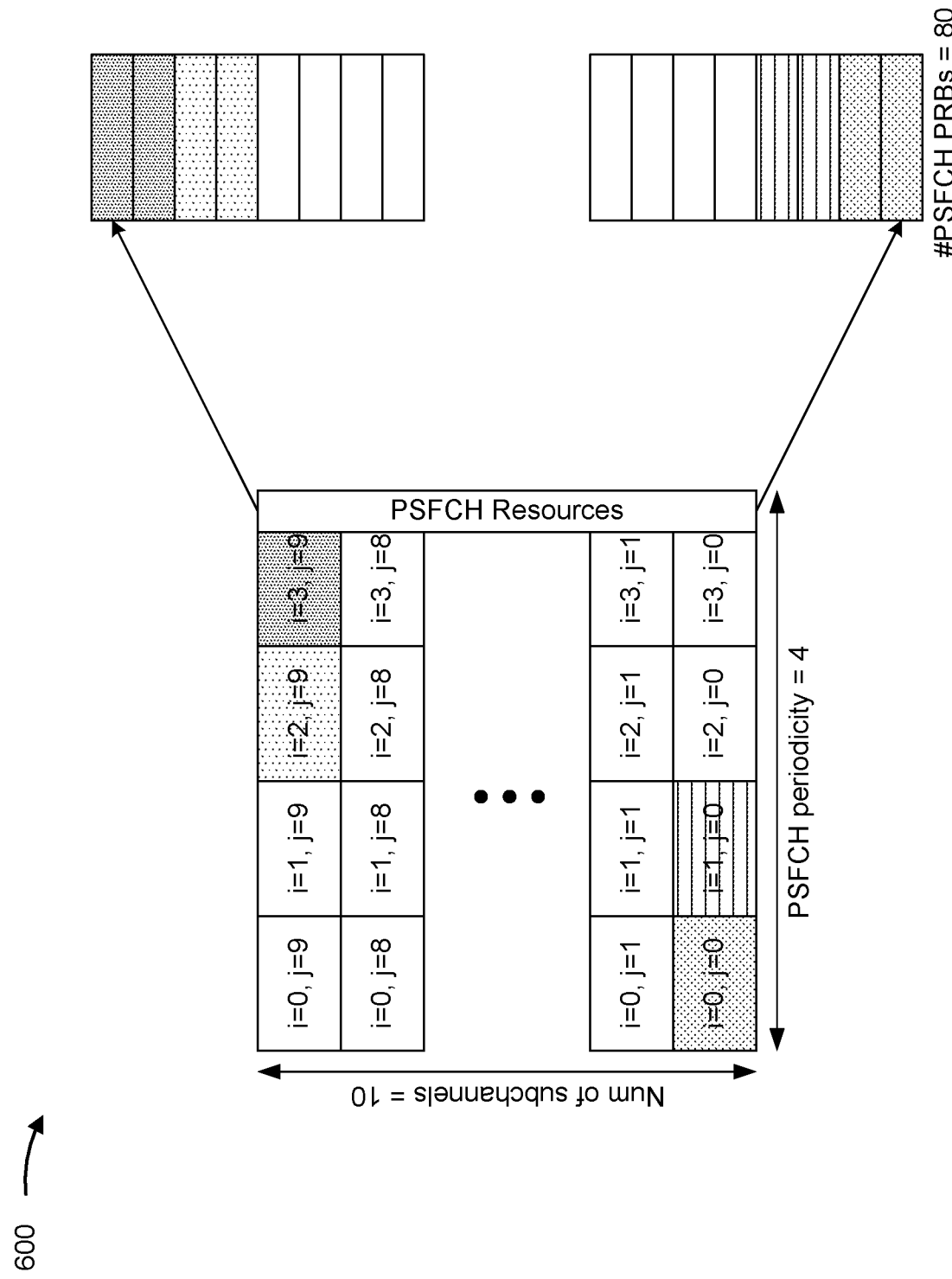
FIG. 6 is a diagram illustrating an example of determining a physical sidelink feedback channel (PSFCH) resource, in accordance with the present disclosure.

FIG. 6 is a diagram illustrating an example 600 of determining a PSFCH resource, in accordance with the present disclosure.

A period PSFCH resource (periodPSFCHresource) parameter may indicate a PSFCH periodicity, in number of slots, in a sidelink resource pool. The period PSFCH resource parameter may be set to {0,1,2, or 4}. When the period PSFCH resource parameter is set to 0, PSFCH transmissions from a UE in the sidelink resource pool may be disabled. The UE may transmit the PSFCH in a first slot that includes PSFCH resources and is at least a number of slots, as provided by a minimum time gap of a PSFCH (MinTimeGapPSFCH) parameter, of the sidelink resource pool after a last slot of a PSSCH reception. A resource block set PSFCH (rbSetPSFCH) parameter may indicate a set of $M_{PRB,set}^{PSFCH}$ resource blocks in the sidelink resource pool for PSFCH transmission. A number of subchannels (numSubchannel) parameter may indicate a number of $N_{subch}$ sub-channels for the sidelink resource pool. A number of PSSCH slots associated with a PSFCH slot may be represented by $N_{PSSCH}^{PSFCH}$, and may be determined based at least in part on the periodPSFCHresource parameter. Further, $M_{PRB,set}^{PSFCH} = \alpha \cdot N_{subch} \cdot N_{PSSCH}^{PSFCH}$, where $\alpha$ represents an integer value. Further, $$M_{subch,slot}^{PSFCH} = \frac{M_{PRB,set}^{PSFCH}}{N_{subch} \cdot N_{PSSCH}^{PSFCH}},$$

where $M_{subch,slot}^{PSFCH}$ represents a number of PSFCH physical resource blocks (PRBs) for a sub-channel.

The UE may allocate $[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH} - 1]$ physical resource blocks from $M_{PRB,set}^{PSFCH}$ physcial resource blocks to slot i and sub-channel j, where $0 \leq i \leq N_{PSSCH}^{PSFCH}$ and $0 \leq j \leq N_{subch}$.

In the example shown in FIG. 6, $N_{PSSCH}^{PSFCH}$ may equal to four, which may correspond to a PSFCH periodicity. Further, $N_{subch}$ may be equal to ten, which may correspond to a number of subchannels for the sidelink resource pool. Further, $M_{subch,slot}^{PSFCH}$ may correspond to $$\frac{80}{4 \times 10},$$

which is equal to two. In other words, each sub-channel may be associated with two PSFCH PRBs, which may correspond to 80 PRBs for the PSFCH. In this example, each sub-channel may be associated with two PSFCH PRBs, but the PSFCH may be sent on one of the PSFCH PRBs.

As indicated above, FIG. 6 is provided as an example. Other examples may differ from what is described with regard to FIG. 6.

HARQ-ACK feedback may be transmitted for NR sidelink communications. For example, a first UE may receive a sidelink communication from the second UE, and the first UE may transmit HARQ-ACK feedback to the second UE based at least in part on the sidelink communication. HARQ-ACK feedback may be transmitted on a PSFCH. The HARQ-ACK feedback may include an ACK to indicate that a sidelink communication was successful, or a NACK to indicate that a sidelink communication was not successful.

For sidelink communications, one or more resource pools may be configured with PSFCH resources. A sidelink HARQ-ACK feedback may be sequence-based. The sidelink HARQ-ACK feedback may carry a single bit per PSSCH, and the sidelink HARQ-ACK feedback may be transmitted on two consecutive symbols. For example, symbol 11 and symbol 12 of a slot may be used to transmit the sidelink HARQ-ACK feedback. One symbol before and one symbol after a PSFCH symbol may be assigned to a gap. The symbol 11 may be used for automatic gain control (AGC) purposes, so the sidelink HARQ-ACK feedback (e.g., the single bit) may be decoded using only one symbol (e.g., symbol 12).

In an NR PSFCH, the one-bit sidelink HARQ-ACK feedback may be transmitted in each PSFCH transmission. In other words, each PSFCH may correspond to a single transport block. In some cases, configuring the PSFCH to convey one or more HARQ-ACK bits in one PSFCH transmission may be beneficial. For example, in a carrier aggregation scenario, a UE may transmit a HARQ-ACK codebook that includes one or more HARQ-ACK bits corresponding to multiple transport blocks in a same PSFCH transmission. As another example, when a code block group (CBG) is supported, one transport block may include multiple CBGs, and the UE may transmit a one-bit HARQ-ACK feedback for each CBG. As yet another example, the UE may combine a HARQ-ACK bit with additional control information, such as channel state information (CSI) or a scheduling request (SR).

An existing PSFCH design may be insufficient in terms of link budget for conveying one or more HARQ-ACK bits in the PSFCH. In the existing PSFCH design, the PSFCH may occupy two symbols, with one symbol being associated with an AGC. In other words, in the existing PSFCH design, one of the two symbols in the PSFCH may be an AGC symbol, which leaves a single symbol to carry the one or more HARQ-ACK bits. Further, NR sidelink may only support a CP-OFDM waveform, and one PSFCH may occupy at most two OFDM symbols.

Figure 7:
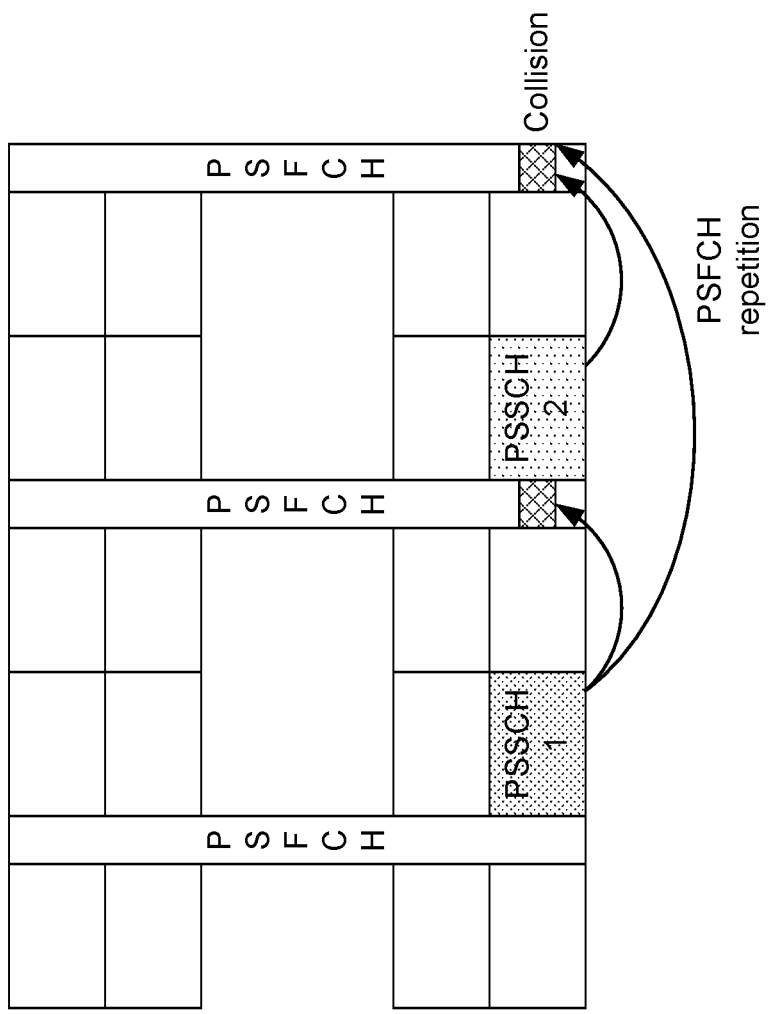
FIG. 7 is a diagram illustrating an example of a PSFCH collision, in accordance with the present disclosure.

FIG. 7 is a diagram illustrating an example 700 of a PSFCH collision, in accordance with the present disclosure.

In a resource pool, some UEs may transmit a PSFCH without repetition. UEs may transmit the PSFCH without repetition when a single ACK/NACK bit is transmitted. In other words, a single ACK/NACK bit transmitted in a PSFCH transmission may be without repetition. However, some UEs may transmit a PSFCH with repetition. UEs may transmit the PSFCH with repetition when one or more ACK/NACK bits are transmitted. In other words, one or more ACK/NACK bits associated with a same PSFCH transmission may be with repetition. The PSFCH without repetition and the PSFCH with repetition may be transmitted in a same set of PSFCH resources in the resource pool.

In some cases, a PSSCH-to-PSFCH mapping rule may cause two PSSCH transmissions to map to two PSFCH transmission occasions, where the two PSFCH transmission occasions may correspond to a PSFCH and a repetition of the PSFCH. In other words, one of the PSSCH transmissions may map to a PSFCH transmission occasion that already carries a PSFCH repetition, thereby causing a collision at the PSFCH transmission occasion.

As shown in FIG. 7, a first PSSCH may be associated with a PSFCH transmission and a repetition of the PSFCH transmission. A second PSSCH may be associated with a PSFCH transmission. However, the repetition of the PSFCH transmission associated with the first PSSCH may conflict with the PSFCH transmission associated with the second PSSCH, based at least in part on a PSSCH-to-PSFCH mapping rule. A collision between the two PSFCH transmissions at a same PSFCH transmission occasion may negatively affect a performance of a UE.

As indicated above, FIG. 7 is provided as an example. Other examples may differ from what is described with regard to FIG. 7.

In various aspects of techniques and apparatuses described herein, a first UE may send, to a second UE, a first PSSCH transmission. The first UE may receive, from the second UE, a plurality of PSFCH transmissions in accordance with a repetition factor based at least in part on the first PSSCH transmission. The plurality of PSFCH transmissions may include one or more HARQ-ACK bits. In some aspects, the plurality of PSFCH transmissions may be associated with a quantity of PSFCH transmissions, where the quantity may be based at least in part on a number of information bits carried in a PSFCH, an indication (e.g., in SCI) from the first UE in a last PSSCH transmission, a preconfigured repetition factor, and/or a priority level associated with the one or more HARQ-ACK bits. PSFCH resources used to transmit the plurality of PSFCH transmissions may be associated with a same sidelink slot, or may be associated with multiple sidelink slots (e.g., one PSFCH repetition per sidelink slot). In some aspects, the first UE may select, for a second PSSCH transmission, a PSSCH resource for which a corresponding PSFCH resource does not collide with one of the plurality of PSFCH transmissions associated with the first PSSCH transmission. The first UE may send, to the second UE, the second PSSCH transmission via the PSSCH resource. As a result, the PSFCH resource that is used to perform the second PSSCH transmission may not collide with a PSFCH repetition associated with the first PSSCH transmission, thereby improving a performance of the first UE and/or the second UE. In other words, a PSFCH associated with the second PSSCH transmission may not collide with a PSFCH repetition associated with the first PSSCH transmission.

Figure 8:
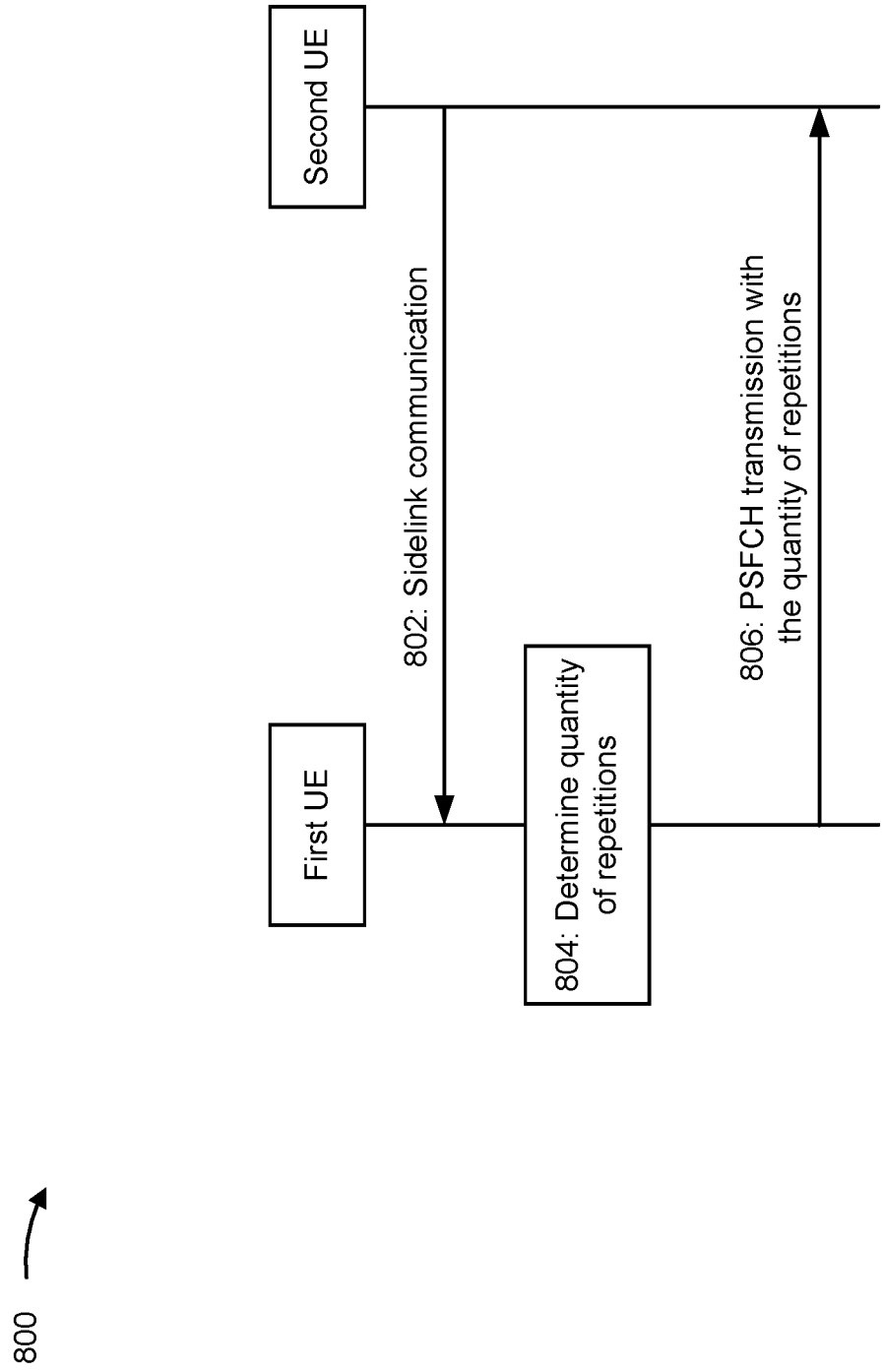
FIGS. 8-13 are diagrams illustrating examples associated with sidelink feedback channel repetitions, in accordance with the present disclosure.

FIG. 8 is a diagram illustrating an example 800 of sidelink feedback channel repetitions, in accordance with the present disclosure. As shown in FIG. 8, example 800 includes communication between a first UE (e.g., UE 120a) and a second UE (e.g., UE 120e). In some aspects, the first UE and the second UE may be included in a wireless network such as wireless network 100. In some aspects, the first UE and the second UE may communicate over a sidelink.

As shown by reference number 802, the first UE may receive, from the second UE, a sidelink communication via a sidelink channel between the first UE and the second UE. For example, the first UE may receive the sidelink communication from the second UE via a PSSCH or a PSCCH.

As shown by reference number 804, the first UE may determine a quantity of repetitions associated with a PSFCH, where the PSFCH may be based at least in part on the sidelink communication received from the second UE. In other words, the first UE may determine a number of repetitions for the PSFCH, which may indicate one or more HARQ-ACK bits based at least in part on whether the sidelink communication was successfully received and decoded at the first UE. The PSFCH may also indicate other control information over sidelink, such as a sidelink CSI or a sidelink scheduling request. The PSFCH may be transmitted with repetition to improve a sidelink link budget.

In some aspects, the first UE may determine the quantity of repetitions based at least in part on a number of information bits carried in the PSFCH. The first UE may receive, from a base station or the second UE, a configuration that configures a plurality of thresholds for determining the quantity of repetitions based at least in part on the number of information bits carried in the PSFCH. In some aspects, the first UE may determine the configuration based at least in part on a reception from the base station, or based at least in part on a pre-configuration of the first UE.

In some aspects, the first UE may determine the quantity of repetitions (e.g., a repetition factor) of the PSFCH based at least in part on the number of information bits carried in the PSFCH. The first UE may implicitly derive the quantity of repetitions based at least in part on the number of information bits. For example, a PSFCH with one or two bits may be transmitted with no repetition, a PSFCH with K1 bits may be transmitted with two repetitions, and a PSFCH with K1+1 or K2 bits may be transmitted with four repetitions, where K1 and K2 may be predefined values. In some cases, a payload size between three and K1 bits may be transmitted with a quantity of repetitions (e.g., two repetitions), a payload size between K1+1 and K2 bits may be transmitted with a quantity of repetitions (e.g., two repetitions), etc. Further, thresholds for determining whether a given number of bits is transmitted with no repetition, two repetitions, four repetitions, etc. may be preconfigured to the first UE (e.g., on a resource pool) or may be hardcoded from the 3GPP specification (e.g., preloaded by the first UE).

In some aspects, the first UE may receive, from the second UE, SCI that indicates the quantity of repetitions. The SCI may be associated with a scheduling of the sidelink communication via the sidelink channel. In some aspects, the quantity of repetitions to be associated with the PSFCH may be indicated by the second UE (e.g., in SCI that schedules a last PSSCH transmission).

In some aspects, the quantity of repetitions may be associated with a preconfigured repetition factor. For example, the quantity of repetitions may be associated with a preconfigured repetition factor on a corresponding resource pool. In some aspects, the quantity of repetitions may be associated with a priority level of the one or more HARQ-ACK bits or control information indicated in the PSFCH. For example, the first UE may determine a configuration that indicates an association between the quantity of repetitions and the priority level of the one or more HARQ-ACK bits. In some aspects, the first UE may be configured/preconfigured with a look-up table, which may be used for identifying the corresponding repetition number for each priority level of a plurality of priority levels.

As shown by reference number 806, the first UE may transmit, to the second UE and based at least in part on the sidelink communication, a PSFCH that indicates the one or more HARQ-ACK bits with the quantity of repetitions. In other words, the first UE may transmit the PSFCH with repetitions.

In some aspects, the first UE may transmit the PSFCH with the quantity of repetitions in a single sidelink slot. In some aspects, PSFCH resources used to transmit the PSFCH with repetitions may be associated with a same sidelink slot. For example, the PSFCH resources may be on back-to-back OFDM symbols, in which case a quantity of OFDM symbols allocated to sidelink PSFCH in a sidelink slot may be increased as compared to a 3GPP Release 16 NR sidelink design.

In some aspects, when transmitting the PSFCH with the quantity of repetitions, the first UE may transmit the quantity of repetitions in a corresponding quantity of sidelink slots, where each repetition is transmitted in a respective sidelink slot. In some aspects, the first UE may transmit the PSFCH with the quantity of repetitions in consecutive sidelink slots, or in consecutive slots that include PSFCH resources. In some aspects, PSFCH resources used to transmit the PSFCH with repetitions may be associated with a single repetition in each sidelink slot. For example, the repetitions of the PSFCH may be transmitted in a quantity of consecutive sidelink slots, or in a quantity of consecutive slots that contain PSFCH resources.

In some aspects, the PSFCH with the quantity of repetitions may be associated with a first resource set and a PSFCH without repetition may be associated with a second resource set that is different from the first resource set. In some aspects, to avoid collision, resources that are used to transmit the PSFCH with repetitions may be configured in a separate resource set from resources used to transmit other PSFCHs without repetition. For example, PSFCH repetitions may be transmitted in different slots or in different resource blocks as compared to the other PSFCHs without repetition.

In some aspects, the first UE may determine a configuration that indicates a periodicity associated with PSFCH transmissions and the quantity of repetitions. In other words, for PSFCH repetitions, the first UE may be configured with a periodicity $N_{PSFCH}$ and the quantity of repetitions (or repetition factor).

In some aspects, the PSFCH with the quantity of repetitions may include a first PSFCH transmission (i.e., an initial PSFCH transmission) and a PSFCH repetition of the first PSFCH transmission. The first PSFCH transmission may occur in slot $t_k$ that satisfies k mod $N_{PSFCH}$=0. The PSFCH repetition may occur in a same slot or on slot $t_{k+1}$, where $t_{k+1}$ is a next sidelink slot (e.g., (k+1)th sidelink slot) from the kth sidelink slot. Further, $t_k$ may denote a physical slot index of a kth sidelink slot, since not all slots may be used for sidelink communication in NR.

In some aspects, a PSSCH may be mapped to the first PSFCH transmission, such as to a starting resource block of the first PSFCH transmission, based at least in part on a mapping rule between the PSSCH and the PSFCH. In some aspects, a same set of resource blocks may be associated with the first PSFCH transmission and the PSFCH repetition. For example, the same resource blocks may be used for repetitions of the PSFCH. In some aspects, a first set of resource blocks may be associated with the first PSFCH transmission, and a second set of resource blocks may be associated with the PSFCH repetition based at least in part on a frequency hopping pattern. The frequency hopping pattern may be defined for repetitions of the PSFCH, where each repetition may occupy a different set of resource blocks. For example, resource blocks for a PSFCH repetition may be equal to $R_2=(R_1+N_{hop})$ mod $M_{RB}^{PSFCH}$, where $R_1$ is a resource block index for the first PSFCH transmission, $N_{hop}$ is a hopping gap, and $M_{RB}^{PSFCH}$ is a total number of resource blocks for PSFCH transmissions in a resource pool. In some aspects, the second set of resource blocks may be determined based at least in part on a source ID and/or destination ID and/or slot/frame index.

As indicated above, FIG. 8 is provided as an example. Other examples may differ from what is described with regard to FIG. 8.

Figure 9:
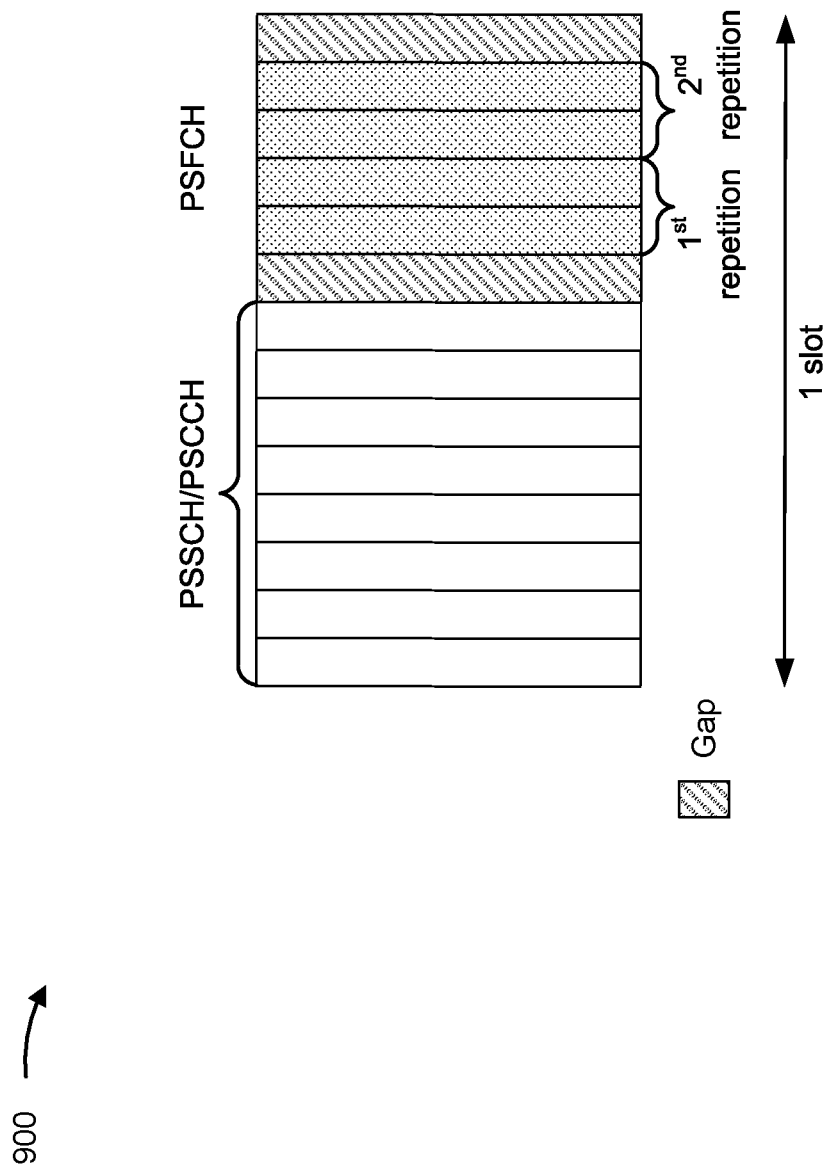

FIG. 9 is a diagram illustrating an example 900 of sidelink feedback channel repetitions, in accordance with the present disclosure.

As shown in FIG. 9, a single slot may include 14 symbols. A PSSCH and/or a PSCCH in the slot may occupy a first 8 symbols of the slot. A PSFCH in the slot may occupy four symbols of the slot. The PSFCH and the PSSCH/PSCCH may be separated by a one-symbol gap. The PSFCH may carry feedback based at least in part on sidelink communications carried in the PSSCH/PSCCH. In some aspects, the PSFCH may include multiple PSFCH repetitions. For example, the PSFCH may include a first PSFCH repetition that occupies two symbols and a second PSFCH repetition that occupies two symbols. In this example, the multiple PSFCH repetitions may be included in the single slot. In another example, each PSFCH transmission may be scheduled with one OFDM symbol, and one AGC symbol may be transmitted before PSFCH repetitions (e.g., all PSFCH repetitions). In this example, a UE may transmit one AGC symbol and K OFDM symbols for the PSFCH, where K is a determined repetition factor.

As indicated above, FIG. 9 is provided as an example. Other examples may differ from what is described with regard to FIG. 9.

Figure 10:
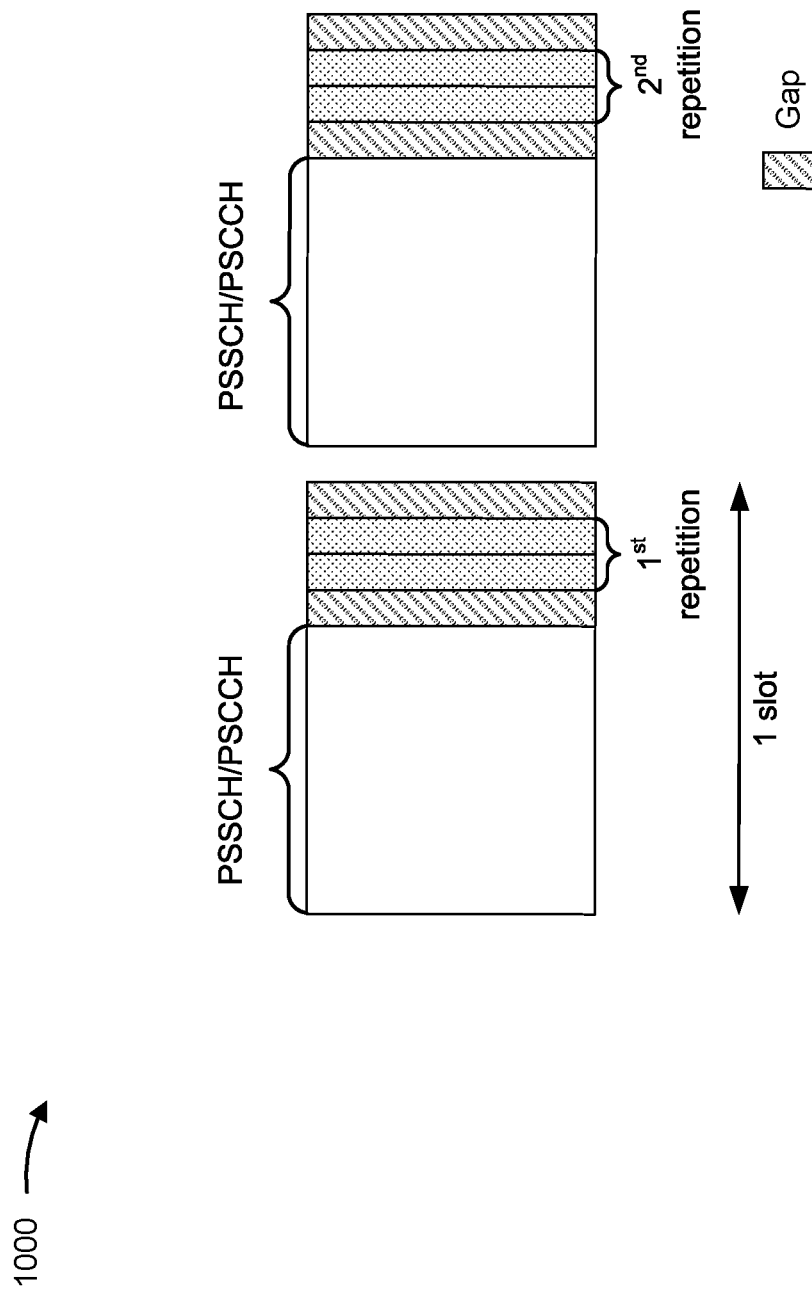

FIG. 10 is a diagram illustrating an example 1000 of sidelink feedback channel repetitions, in accordance with the present disclosure.

As shown in FIG. 10, a first slot may include a first PSSCH/PSCCH and a first PSFCH, and a second slot may include a second PSSCH/PSCCH and a second PSFCH. The first PSFCH may be associated with a first PSFCH repetition and the second PSFCH may be associated with a second PSFCH repetition. In this example, a separate PSFCH repetition may be included in each slot.

As indicated above, FIG. 10 is provided as an example. Other examples may differ from what is described with regard to FIG. 10.

Figure 11:
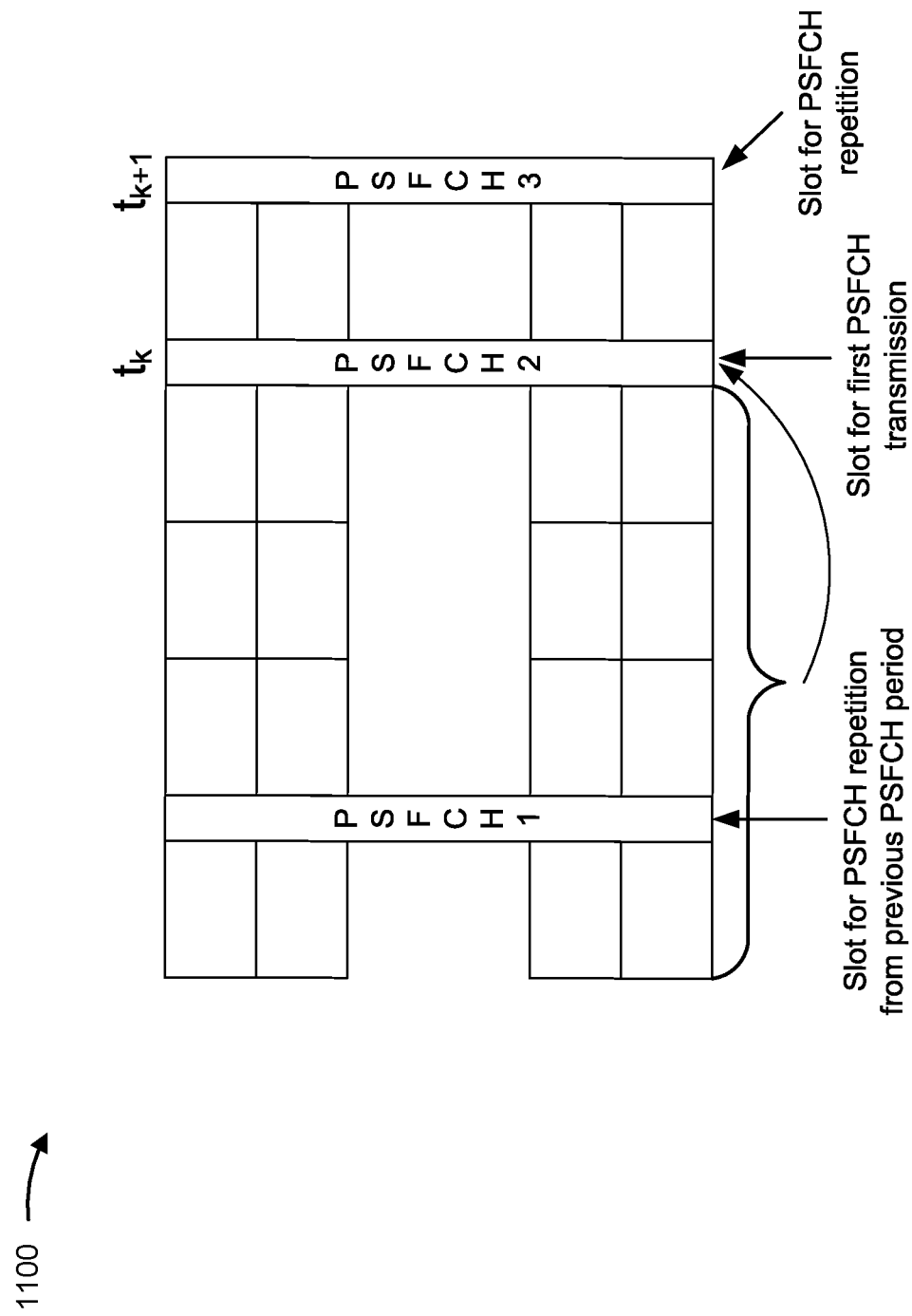

FIG. 11 is a diagram illustrating an example 1100 of sidelink feedback channel repetitions, in accordance with the present disclosure.

As shown in FIG. 11, a UE may be configured with a periodicity of four and a repetition factor of two, such that a PSFCH may occur in slot $t_k$ for which k mod 4=0 or 1. In this example, a first PSFCH (PSFCH 1) may be associated with a slot for a PSFCH repetition from a previous PSFCH period, a second PSFCH (PSFCH 2) may be a slot for a first PSFCH transmission (i.e., an initial PSFCH transmission) and may correspond to slot $t_k$, and a third PSFCH (PSFCH 3) may be a slot for a PSFCH repetition and may correspond to slot $t_{k+1}$. The PSFCH repetition may be a repetition of the first PSFCH transmission.

In some aspects, the slot for the first PSFCH transmission may also be used to transmit a PSFCH without repetition. However, the slot for the PSFCH repetition may be used to transmit PSFCH repetitions (e.g., the slot may only be used to transmit PSFCH repetitions).

As indicated above, FIG. 11 is provided as an example. Other examples may differ from what is described with regard to FIG. 11.

Figure 12:
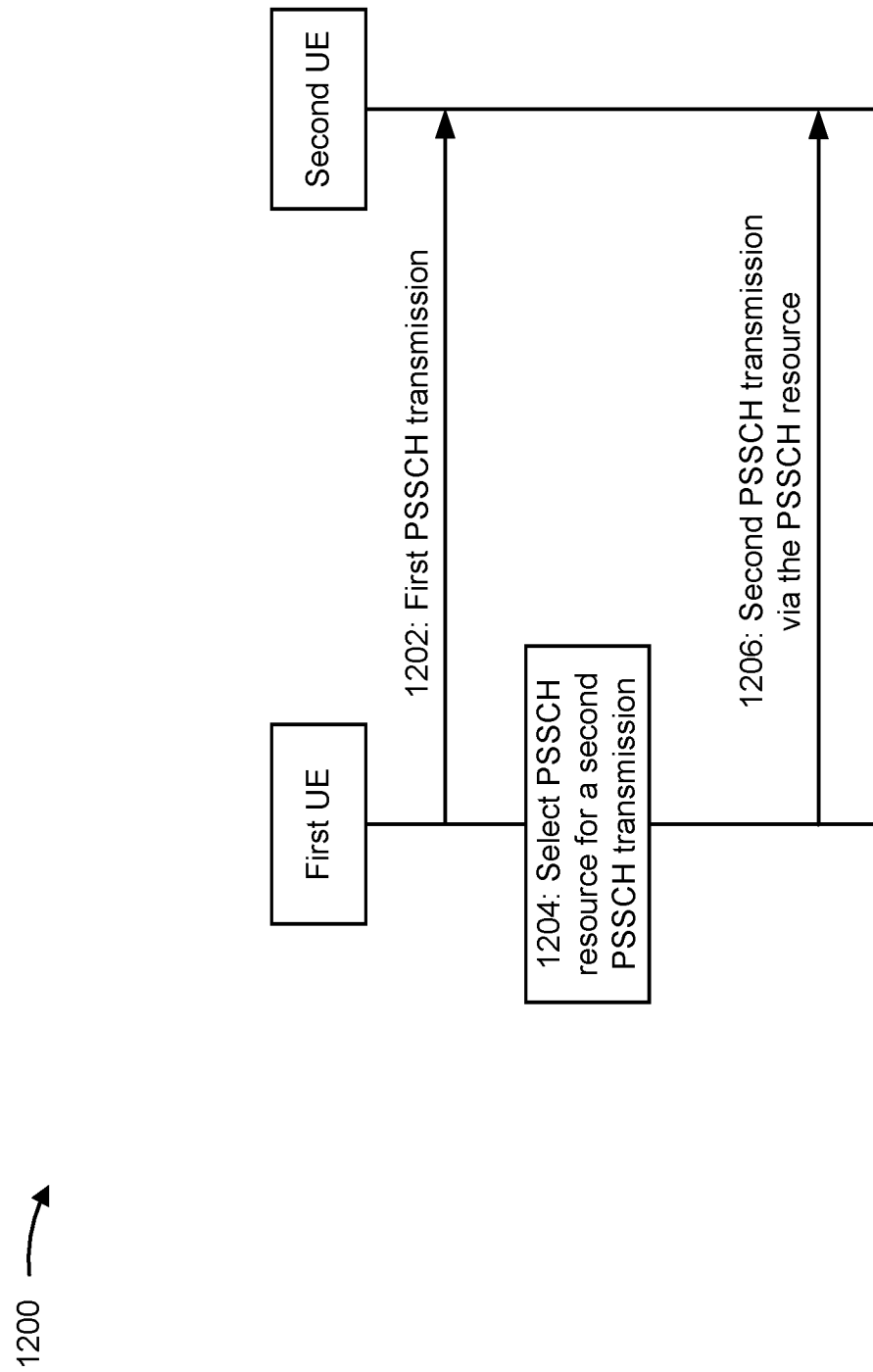

FIG. 12 is a diagram illustrating an example 1200 of sidelink feedback channel repetitions, in accordance with the present disclosure. As shown in FIG. 12, example 1200 includes communication between a first UE (e.g., UE 120a) and a second UE (e.g., UE 120e). In some aspects, the first UE and the second UE may be included in a wireless network such as wireless network 100. In some aspects, the first UE and the second UE may communicate over a sidelink.

As shown by reference number 1202, the first UE may send, to the second UE, a first PSSCH transmission. In other words, the first UE may perform the first PSSCH transmission to the second UE.

In some aspects, the first UE may receive, from the second UE, a plurality of PSFCH transmissions in accordance with a repetition factor based at least in part on the first PSSCH transmission. In other words, the second UE may receive the first PSSCH transmission from the first UE, and based at least in part on the first PSSCH transmission, the second UE may transmit the plurality of PSFCH transmissions to the first UE. The plurality of PSFCH transmissions may be associated with a HARQ-ACK feedback that includes one or more HARQ-ACK bits. The second UE may transmit the plurality of PSFCH transmissions in accordance with the repetition factor. The second UE may transmit, based at least in part on the first PSSCH transmission, a first PSFCH transmission and multiple repetitions of the first PSFCH transmission.

As shown by reference number 1204, the first UE may select a PSSCH resource for a second PSSCH transmission to the second UE. The first UE may select the PSSCH resource for which a corresponding PSFCH resource does not collide with one of the plurality of PSFCH transmissions in accordance with the repetition factor associated with the first PSSCH transmission. In other words, the first UE may select a PSSCH resource for which a corresponding PSFCH resource does not already carry the first PSFCH transmission or a repetition of the first PSFCH transmission, which would cause a conflict if that PSSCH resource were to be used for the second PSSCH transmission. In some aspects, a PSFCH corresponding to the second PSSCH transmission may be transmitted (e.g., by a receiving UE) at a same slot on different resource blocks from a repetition of a PSFCH for the first PSSCH transmission.

In some aspects, the first UE, when selecting resources for a PSSCH transmission to the second UE, may avoid using a PSSCH resource for which a corresponding PSFCH is on a same resource or resource block as a PSFCH repetition of a previous PSSCH transmission with the second UE.

In some aspects, the first UE may select the PSSCH resource for which the corresponding PSFCH resource does not collide with one of the plurality of PSFCH transmissions, and may avoid using the PSSCH resource for which the corresponding PSFCH is on the same resource or resource block as the PSFCH repetition of the previous PSSCH transmission, based at least in part on a priority associated with the second PSSCH transmission not being higher higher than a priority associated with the first PSSCH transmission. On the other hand, when the priority of the second PSSCH transmission is larger than the priority of the first PSSCH transmission, the first UE may not be constrained when selecting the PSSCH resource.

As shown by reference number 1206, the first UE may send, to the second UE, the second PSSCH transmission via the PSSCH resource. The first UE may send the second PSSCH transmission based at least in part on receiving the plurality of PSFCH transmissions in accordance with the repetition factor from the second UE. The PSSCH resource used to perform the second PSSCH transmission may not correspond to a PSFCH resource that collides with one of the plurality of PSFCH transmissions in accordance with the repetition factor associated with the first PSSCH transmission.

In some aspects, the first UE may send the second PSSCH transmission after the plurality of PSFCH transmissions are received from the second UE based at least in part on the first PSSCH transmission. In other words, for the first UE that performs the first PSSCH transmission, the first UE may not perform the second PSSCH transmission before the first UE receives, from the second UE, a plurality of PSFCH repetitions (e.g., all of the PSFCH repetitions) for the first PSSCH transmission. In this case, the first PSSCH transmission may be a previous PSSCH transmission with respect to the second PSSCH transmission.

In some aspects, the first PSSCH transmission and the second PSSCH transmission may be associated with a single resource pool. In this example, when the first PSSCH transmission and the second PSSCH transmission are associated with the same resource pool, the first UE may not perform the second PSSCH transmission before the first UE receives, from the second UE, a plurality of PSFCH repetitions (e.g., all of the PSFCH repetitions) for the first PSSCH transmission. In other words, the first UE may apply a restriction of not transmitting a PSSCH before receiving PSFCH repetitions for a previous PSSCH on a per resource pool basis.

In some aspects, for a first PSSCH transmission and a second PSSCH that are not associated with a same resource pool, the first UE may perform the second PSSCH transmission before the first UE receives, from the second UE, a plurality of PSFCH repetitions for the first PSSCH transmission. For example, the first PSSCH transmission may be associated with a first resource pool, and the first UE may send, to the second UE, the second PSSCH transmission associated with a second resource pool irrespective of whether a plurality of PSFCH transmissions are received from the second UE based at least in part on the first PSSCH transmission. In other words, the first UE may still transmit a PSSCH in another resource pool, without waiting for a plurality of PSFCH repetitions (e.g., all PSFCH repetitions) for a previous PSSCH transmission to finish.

As indicated above, FIG. 12 is provided as an example. Other examples may differ from what is described with regard to FIG. 12.

Figure 13:
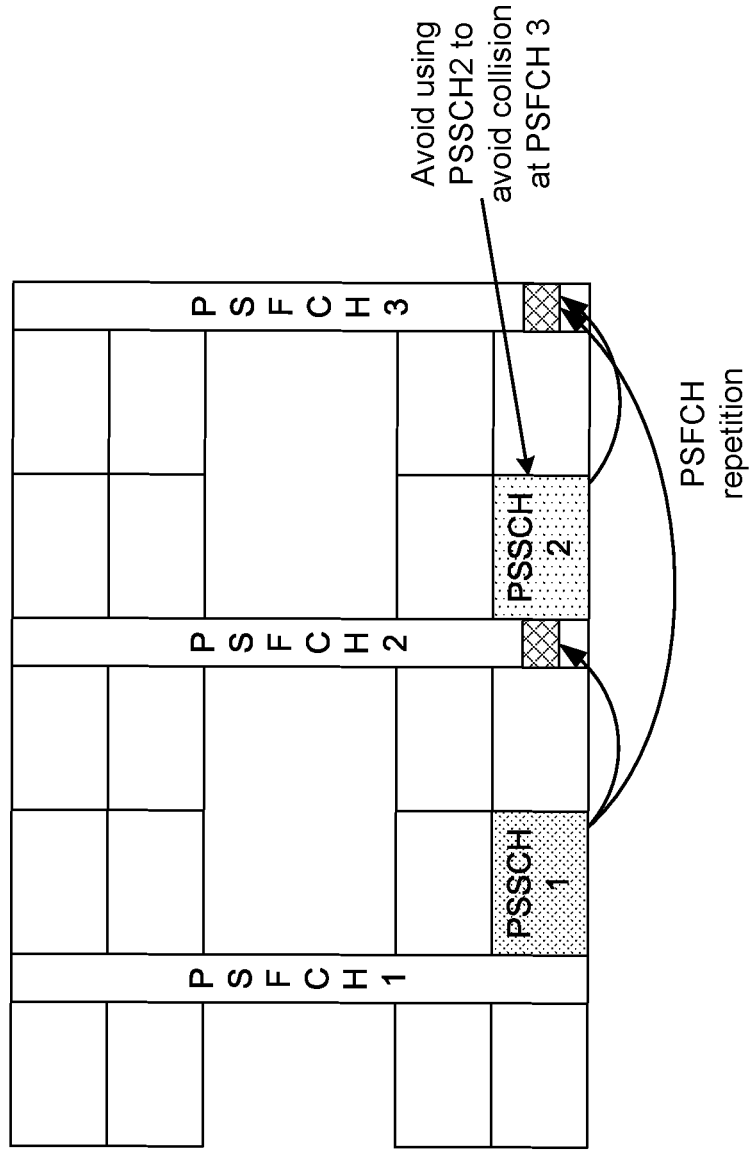

FIG. 13 is a diagram illustrating an example 1300 of sidelink feedback channel repetitions, in accordance with the present disclosure.

As shown by FIG. 13, a quantity of PSSCH resources may map to a PSFCH slot based at least in part on a periodicity associated with the PSFCH slot. For example, a PSFCH may be configured with a periodicity of two slots. In this case, every two PSSCH slots may map to a PSFCH slot. A UE may transmit a first PSSCH (PSSCH 1) in a first PSFCH resource. The first PSSCH may correspond to a second PSFCH resource (PSFCH 2).

In some aspects, the UE may not transmit in a subsequent PSSCH (e.g., any subsequent PSSCH) until a plurality of PSFCH repetitions (e.g., all PSFCH repetitions) associated with the first PSSCH are finished. In other words, the UE may not transmit additional PSSCHs until the PSFCH repetitions are received based at least in part on the first PSSCH.

In some aspects, the UE may not use a second PSSCH (PSSCH 2) for a PSSCH transmission, since a corresponding PSFCH resource may map to a third PSFCH resource (PSFCH 3) that may collide with a repetition of a previous PSFCH transmission associated with the first PSSCH. In other words, since the second PSFCH resource may be used for a PSFCH transmission for the first PSSCH and the third PSFCH resource may be used for a repetition of the PSFCH transmission, using the second PSSCH may result in a collision at the third PSFCH resource since the second PSSCH may also map to the third PSFCH resource. As a result, the UE may not use the second PSSCH for a PSSCH transmission, thereby avoiding the collision at the third PSFCH resource.

As indicated above, FIG. 13 is provided as an example. Other examples may differ from what is described with regard to FIG. 13.

Figure 14:
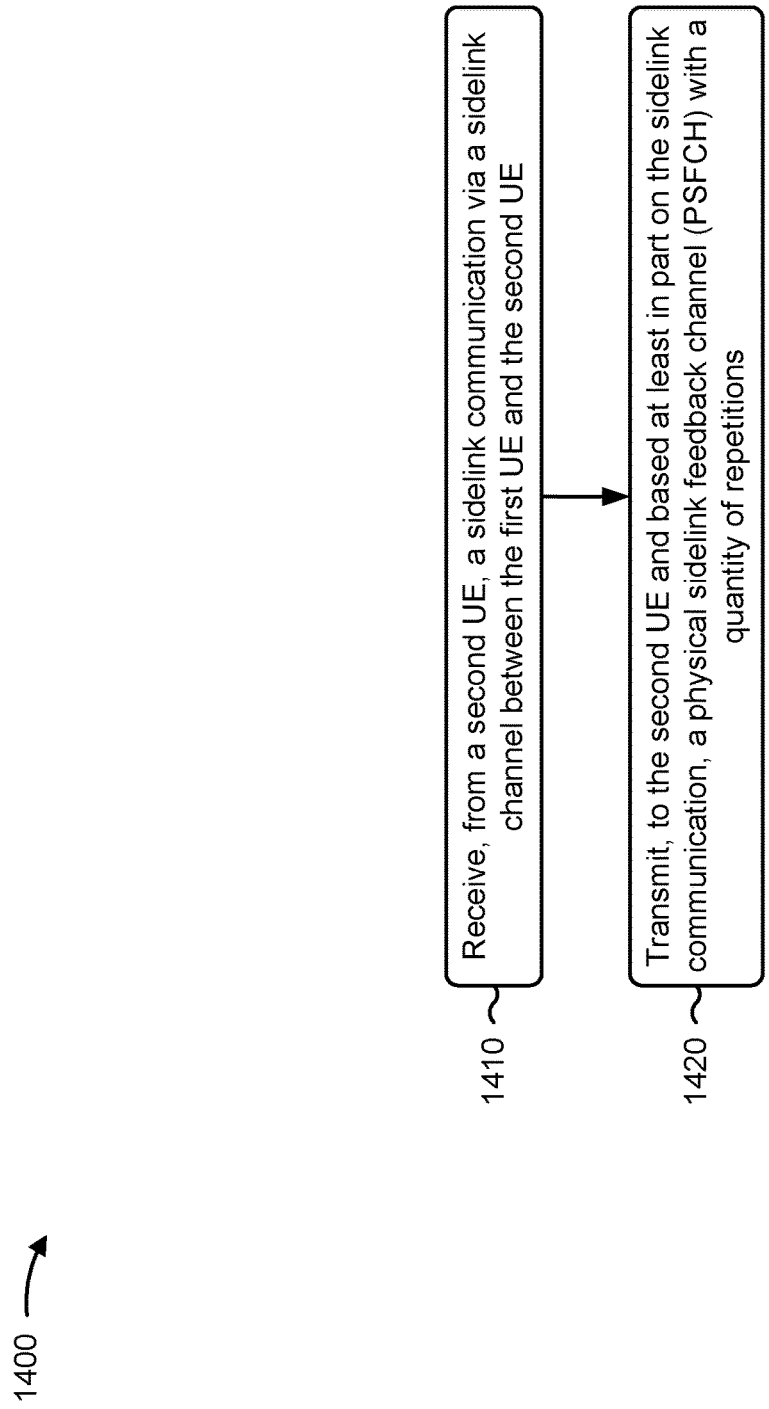
FIGS. 14-17 are diagrams illustrating example processes associated with sidelink feedback channel repetitions, in accordance with the present disclosure.

FIG. 14 is a diagram illustrating an example process 1400 performed, for example, by a first UE, in accordance with the present disclosure. Example process 1400 is an example where the first UE (e.g., UE 120a) performs operations associated with sidelink feedback channel repetitions.

As shown in FIG. 14, in some aspects, process 1400 may include receiving, from a second UE, a sidelink communication via a sidelink channel between the first UE and the second UE (block 1410). For example, the UE (e.g., using reception component 1802, depicted in FIG. 18) may receive, from a second UE, a sidelink communication via a sidelink channel between the first UE and the second UE, as described above.

As further shown in FIG. 14, in some aspects, process 1400 may include transmitting, to the second UE and based at least in part on the sidelink communication, a PSFCH with a quantity of repetitions (block 1420). For example, the UE (e.g., using transmission component 1804, depicted in FIG. 18) may transmit, to the second UE and based at least in part on the sidelink communication, a PSFCH with a quantity of repetitions, as described above.

Process 1400 may include additional aspects, such as any single aspect or any combination of aspects described below and/or in connection with one or more other processes described elsewhere herein.

In a first aspect, process 1400 includes determining the quantity of repetitions based at least in part on a number of information bits carried in the PSFCH.

In a second aspect, alone or in combination with the first aspect, process 1400 includes determining a configuration for a plurality of thresholds; and determining the quantity of repetitions based at least in part on the plurality of thresholds.

In a third aspect, alone or in combination with one or more of the first and second aspects, process 1400 includes receiving, from the second UE, sidelink control information that indicates the quantity of repetitions, wherein the sidelink control information is associated with a scheduling of the sidelink communication via the sidelink channel.

In a fourth aspect, alone or in combination with one or more of the first through third aspects, the quantity of repetitions is associated with a preconfigured repetition factor.

In a fifth aspect, alone or in combination with one or more of the first through fourth aspects, the PSFCH indicates one or more HARQ-ACK bits, and process 1400 includes determining a configuration that indicates an association between the quantity of repetitions and a priority level of the one or more HARQ-ACK bits.

In a sixth aspect, alone or in combination with one or more of the first through fifth aspects, transmitting the PSFCH with the quantity of repetitions comprises transmitting the PSFCH with the quantity of repetitions in a single sidelink slot.

In a seventh aspect, alone or in combination with one or more of the first through sixth aspects, transmitting the PSFCH with the quantity of repetitions comprises transmitting the quantity of repetitions in a corresponding quantity of sidelink slots, where each repetition is transmitted in a respective sidelink slot.

In an eighth aspect, alone or in combination with one or more of the first through seventh aspects, transmitting the PSFCH with the quantity of repetitions comprises: transmitting the PSFCH with the quantity of repetitions in consecutive sidelink slots; or transmitting the PSFCH with the quantity of repetitions in consecutive sidelink slots that include PSFCH resources.

In a ninth aspect, alone or in combination with one or more of the first through eighth aspects, the PSFCH with the quantity of repetitions is associated with a first resource set and a PSFCH without repetition is associated with a second resource set that is different from the first resource set.

In a tenth aspect, or in combination with one or more of the first through ninth aspects, a slot for an initial PSFCH transmission is used to transmit a PSFCH without repetition, and a slot for a PSFCH repetition is not used for transmitting non-PSFCH repetitions.

In an eleventh aspect, alone or in combination with one or more of the first through tenth aspects, process 1400 includes determining a configuration that indicates a periodicity associated with PSFCH transmissions and the quantity of repetitions.

In a twelfth aspect, alone or in combination with one or more of the first through eleventh aspects, the PSFCH with the quantity of repetitions includes a first PSFCH transmission and a PSFCH repetition.

In a thirteenth aspect, alone or in combination with one or more of the first through twelfth aspects, a same set of resource blocks is associated with the first PSFCH transmission and the PSFCH repetition.

In a fourteenth aspect, alone or in combination with one or more of the first through thirteenth aspects, a first set of resource blocks is associated with the first PSFCH transmission and a second set of resource blocks is associated with the PSFCH repetition.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
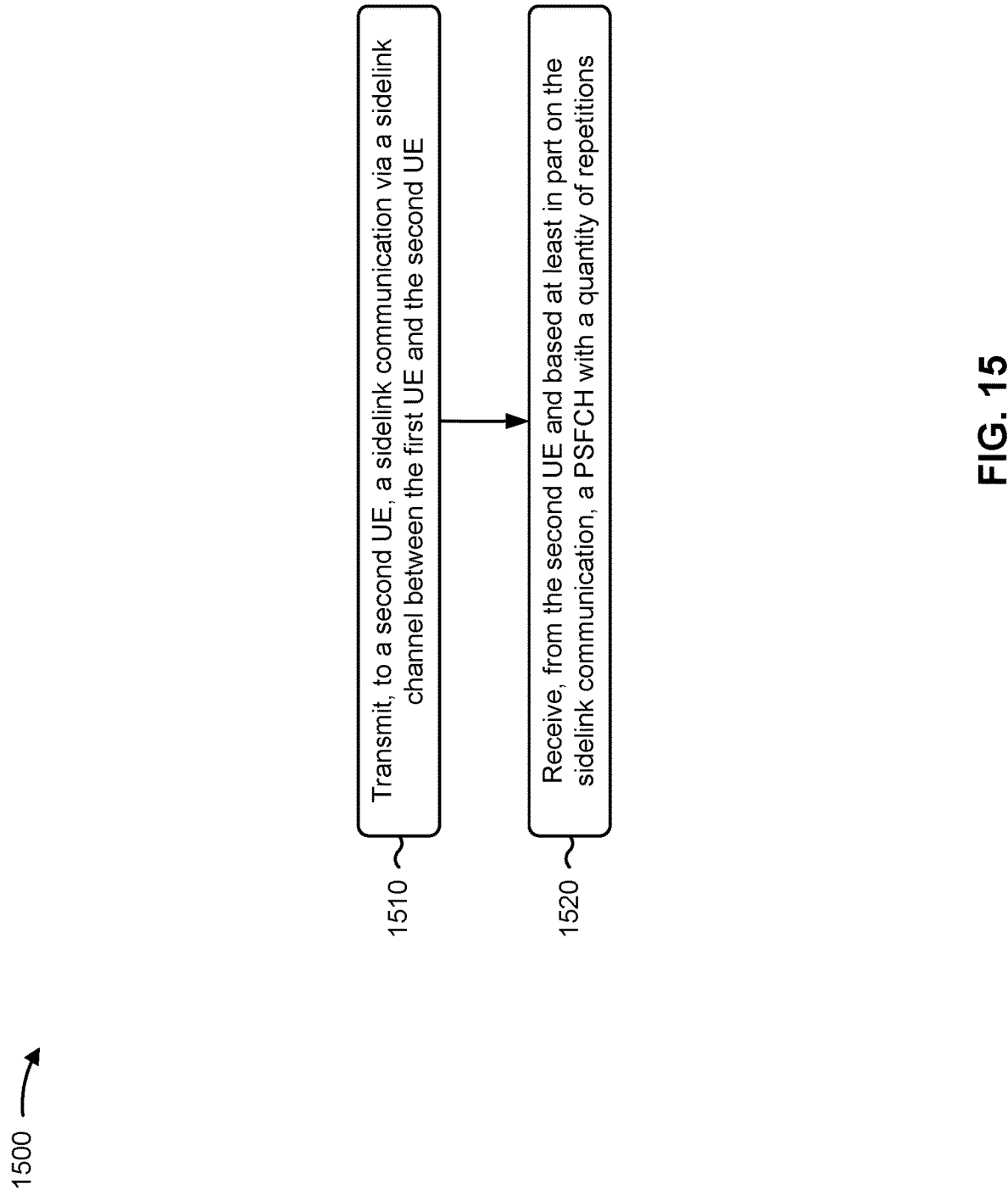

FIG. 15 is a diagram illustrating an example process 1500 performed, for example, by a first UE, in accordance with the present disclosure. Example process 1500 is an example where the first UE (e.g., UE 120a) performs operations associated with sidelink feedback channel repetitions.

As shown in FIG. 15, in some aspects, process 1500 may include transmitting, to a second UE, a sidelink communication via a sidelink channel between the first UE and the second UE (block 1510). For example, the UE (e.g., using transmission component 1804, depicted in FIG. 18) may transmit, to a second UE, a sidelink communication via a sidelink channel between the first UE and the second UE, as described above.

As further shown in FIG. 15, in some aspects, process 1500 may include receiving, from the second UE and based at least in part on the sidelink communication, a PSFCH with a quantity of repetitions (block 1520). For example, the UE (e.g., using reception component 1802, depicted in FIG. 18) may receive, from the second UE and based at least in part on the sidelink communication, a PSFCH with a quantity of repetitions, as described above.

Process 1500 may include additional aspects, such as any single aspect or any combination of aspects described below and/or in connection with one or more other processes described elsewhere herein.

In a first aspect, the quantity of repetitions is based at least in part on a number of information bits carried in the PSFCH.

In a second aspect, alone or in combination with the first aspect, process 1500 includes transmitting, to the second UE, sidelink control information that indicates the quantity of repetitions, wherein the sidelink control information is associated with a scheduling of the sidelink communication via the sidelink channel.

In a third aspect, alone or in combination with one or more of the first and second aspects, the quantity of repetitions is associated with a preconfigured repetition factor.

In a fourth aspect, alone or in combination with one or more of the first through third aspects, the PSFCH indicates one or more HARQ-ACK bits, and process 1500 includes determining a configuration that indicates an association between the quantity of repetitions and a priority level of the one or more HARQ-ACK bits.

In a fifth aspect, alone or in combination with one or more of the first through fourth aspects, receiving the PSFCH with the quantity of repetitions comprises receiving the PSFCH with the quantity of repetitions in a single sidelink slot.

In a sixth aspect, alone or in combination with one or more of the first through fifth aspects, receiving the PSFCH with the quantity of repetitions comprises receiving the quantity of repetitions in a corresponding quantity of sidelink slots, where each repetition is received in a respective sidelink slot.

In a seventh aspect, alone or in combination with one or more of the first through sixth aspects, receiving the PSFCH with the quantity of repetitions comprises: receiving the PSFCH with the quantity of repetitions in consecutive sidelink slots; or receiving the PSFCH with the quantity of repetitions in consecutive sidelink slots that include PSFCH resources.

In an eighth aspect, alone or in combination with one or more of the first through seventh aspects, the PSFCH with the quantity of repetitions is associated with a first resource set and a PSFCH without repetition is associated with a second resource set that is different from the first resource set.

In a ninth aspect, a slot for an initial PSFCH transmission is used to transmit a PSFCH without repetition, alone or in combination with one or more of the first through eighth aspects, and a slot for a PSFCH repetition is not used for transmitting non-PSFCH repetitions.

In a tenth aspect, alone or in combination with one or more of the first through ninth aspects, the PSFCH with the quantity of repetitions includes a first PSFCH transmission and a PSFCH repetition.

In an eleventh aspect, alone or in combination with one or more of the first through tenth aspects, a same set of resource blocks is associated with the first PSFCH transmission and the PSFCH repetition.

In a twelfth aspect, alone or in combination with one or more of the first through eleventh aspects, a first set of resource blocks is associated with the first PSFCH transmission and a second set of resource blocks is associated with the PSFCH repetition.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
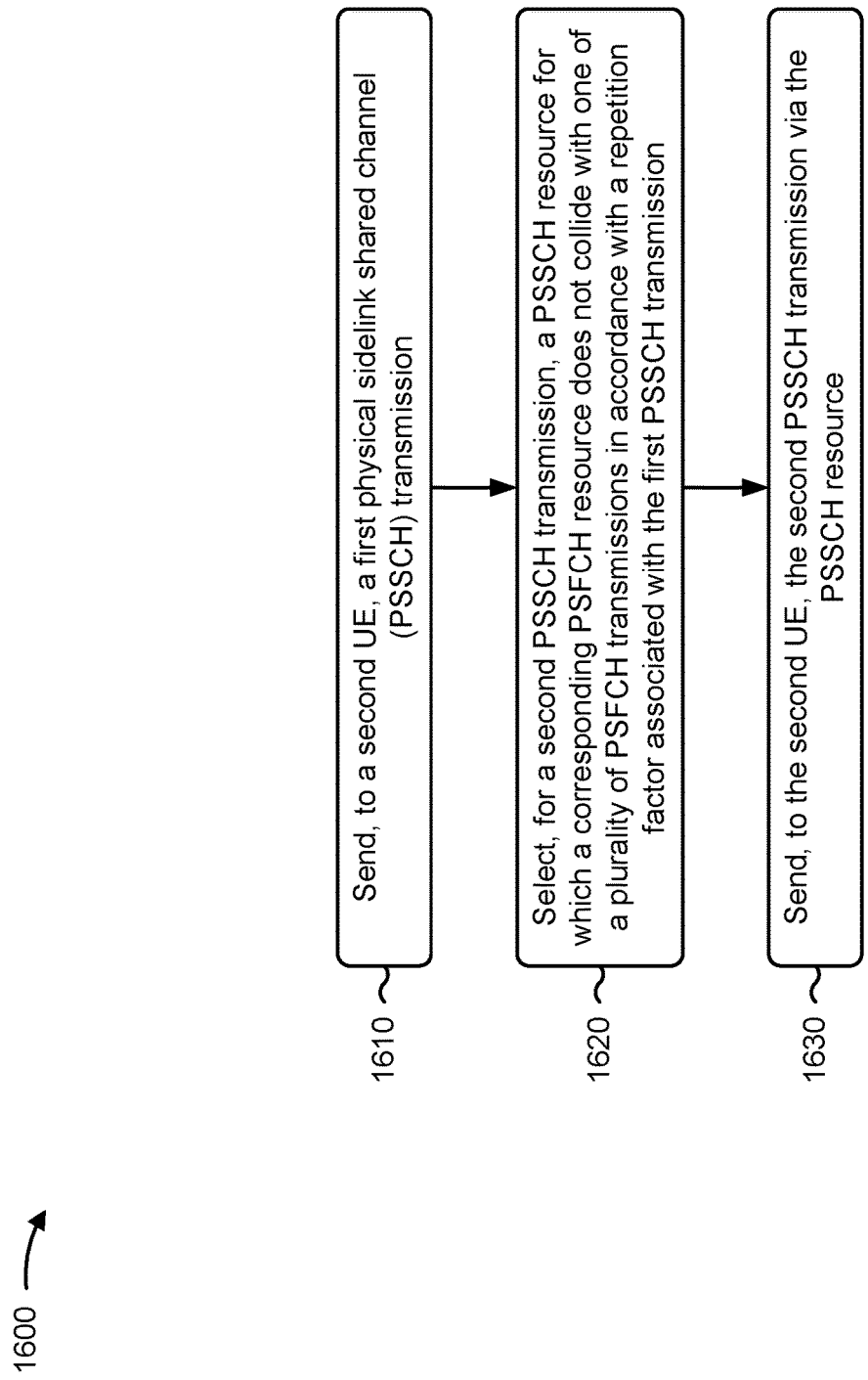

FIG. 16 is a diagram illustrating an example process 1600 performed, for example, by a first UE, in accordance with the present disclosure. Example process 1600 is an example where the first UE (e.g., UE 120a) performs operations associated with sidelink feedback channel repetitions.

As shown in FIG. 16, in some aspects, process 1600 may include sending, to a second UE, a first PSSCH transmission (block 1610). For example, the UE (e.g., using transmission component 1804, depicted in FIG. 18) may send, to a second UE, a first PSSCH transmission, as described above.

As further shown in FIG. 16, in some aspects, process 1600 may include selecting, for a second PSSCH transmission, a PSSCH resource for which a corresponding PSFCH resource does not collide with one of a plurality of PSFCH transmissions in accordance with a repetition factor associated with the first PSSCH transmission (block 1620). For example, the UE (e.g., using selection component 1810, depicted in FIG. 18) may select, for a second PSSCH transmission, a PSSCH resource for which a corresponding PSFCH resource does not collide with one of a plurality of PSFCH transmissions in accordance with a repetition factor associated with the first PSSCH transmission, as described above.

As further shown in FIG. 16, in some aspects, process 1600 may include sending, to the second UE, the second PSSCH transmission via the PSSCH resource (block 1630). For example, the UE (e.g., using transmission component 1804, depicted in FIG. 18) may send, to the second UE, the second PSSCH transmission via the PSSCH resource, as described above.

Process 1600 may include additional aspects, such as any single aspect or any combination of aspects described below and/or in connection with one or more other processes described elsewhere herein.

In a first aspect, process 1600 includes receiving, from the second UE, the plurality of PSFCH transmissions in accordance with the repetition factor based at least in part on the first PSSCH transmission.

In a second aspect, alone or in combination with the first aspect, process 1600 includes sending, to the second UE, the second PSSCH transmission based at least in part on receiving the plurality of PSFCH transmissions in accordance with the repetition factor from the second UE.

In a third aspect, alone or in combination with one or more of the first and second aspects, the second PSSCH transmission is performed after the plurality of PSFCH transmissions are received from the second UE based at least in part on the first PSSCH transmission.

In a fourth aspect, alone or in combination with one or more of the first through third aspects, the first PSSCH transmission and the second PSSCH transmission are associated with a single resource pool.

In a fifth aspect, alone or in combination with one or more of the first through fourth aspects, the first PSSCH transmission is associated with a first resource pool, and process 1600 includes sending, to the second UE, the second PSSCH transmission associated with a second resource pool irrespective of whether a plurality of PSFCH transmissions in accordance with a repetition factor are received from the second UE based at least in part on the first PSSCH transmission.

In a sixth aspect, alone or in combination with one or more of the first through fifth aspects, a quantity of PSSCH resources map to a PSFCH slot based at least in part on a periodicity associated with the PSFCH slot.

In a seventh aspect, alone or in combination with one or more of the first through sixth aspects, the plurality of PSFCH transmissions in accordance with the repetition factor are associated with a HARQ-ACK feedback that includes one or more HARQ-ACK bits.

In an eighth aspect, alone or in combination with one or more of the first through sixth aspects, a PSFCH corresponding to the second PSSCH transmission is transmitted by the second UE at a same slot on different resource blocks from a repetition of a PSFCH for the first PSSCH transmission.

In a ninth aspect, alone or in combination with one or more of the first through sixth aspects, a priority associated with the second PSSCH transmission is not higher than a priority associated with the first PSSCH transmission.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
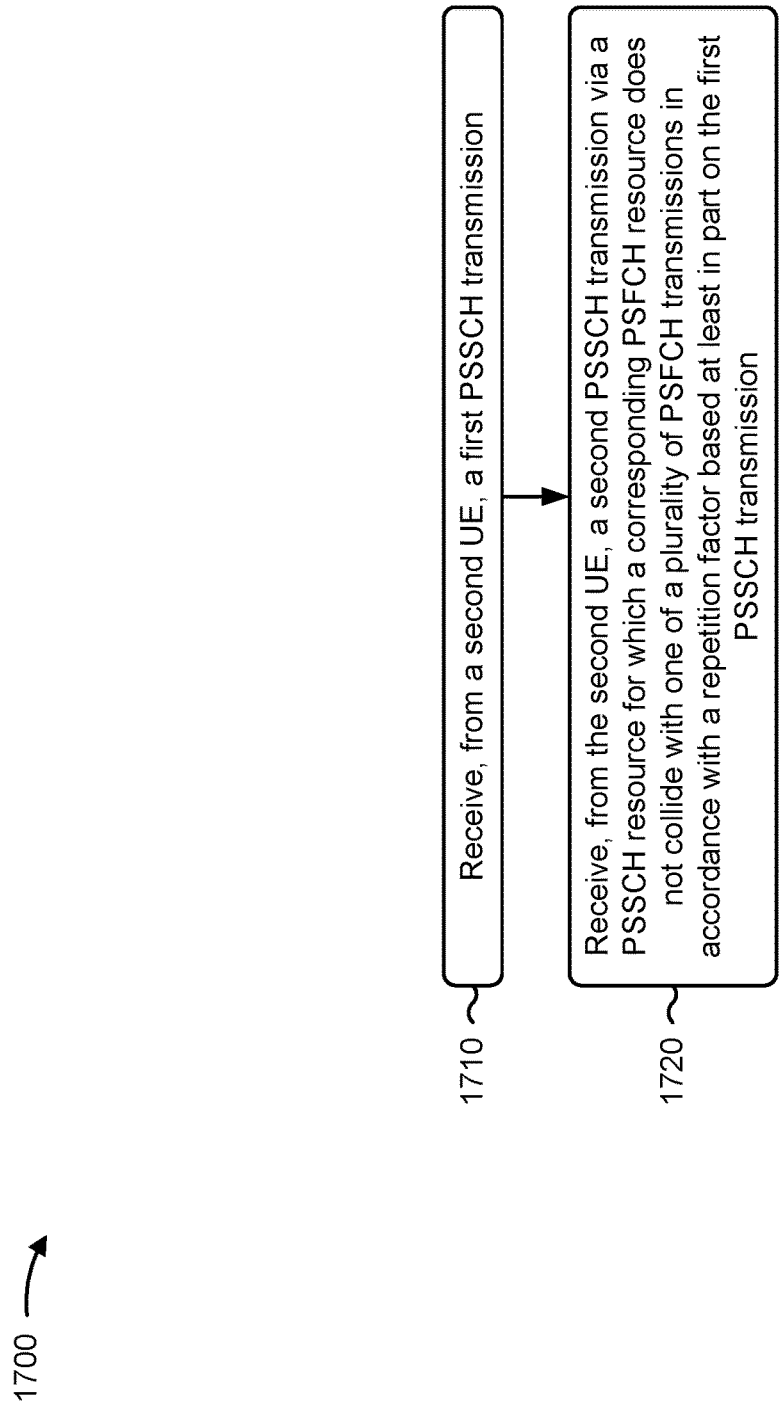

FIG. 17 is a diagram illustrating an example process 1700 performed, for example, by a first UE, in accordance with the present disclosure. Example process 1700 is an example where the first UE (e.g., UE 120*a*) performs operations associated with sidelink feedback channel repetitions.

As shown in FIG. 17, in some aspects, process 1700 may include receiving, from a second UE, a first PSSCH transmission (block 1710). For example, the UE (e.g., using reception component 1802, depicted in FIG. 18) may receive, from a second UE, a first PSSCH transmission, as described above.

As further shown in FIG. 17, in some aspects, process 1700 may include receiving, from the second UE, a second PSSCH transmission via a PSSCH resource for which a corresponding PSFCH resource does not collide with one of a plurality of PSFCH transmissions in accordance with a repetition factor based at least in part on the first PSSCH transmission (block 1720). For example, the UE (e.g., using reception component 1802, depicted in FIG. 18) may receive, from the second UE, a second PSSCH transmission via a PSSCH resource for which a corresponding PSFCH resource does not collide with one of a plurality of PSFCH transmissions in accordance with a repetition factor based at least in part on the first PSSCH transmission, as described above.

Process 1700 may include additional aspects, such as any single aspect or any combination of aspects described below and/or in connection with one or more other processes described elsewhere herein.

In a first aspect, process 1700 includes transmitting, to the second UE, the plurality of PSFCH transmissions in accordance with the repetition factor based at least in part on the first PSSCH transmission.

In a second aspect, alone or in combination with the first aspect, process 1700 includes receiving, from the second UE, the second PSSCH transmission based at least in part on transmitting the plurality of PSFCH transmissions in accordance with the repetition factor to the second UE.

In a third aspect, alone or in combination with one or more of the first and second aspects, the second PSSCH transmission is received after the plurality of PSFCH transmissions are transmitted to the second UE based at least in part on the first PSSCH transmission.

In a fourth aspect, alone or in combination with one or more of the first through third aspects, the first PSSCH transmission and the second PSSCH transmission are associated with a single resource pool.

In a fifth aspect, alone or in combination with one or more of the first through fourth aspects, the first PSSCH transmission is associated with a first resource pool, and process 1700 includes receiving, from the second UE, the second PSSCH transmission associated with a second resource pool irrespective of whether a plurality of PSFCH transmissions in accordance with a repetition factor are transmitted to the second UE based at least in part on the first PSSCH transmission.

In a sixth aspect, alone or in combination with one or more of the first through fifth aspects, a quantity of PSSCH resources map to a PSFCH slot based at least in part on a periodicity associated with the PSFCH slot.

In a seventh aspect, alone or in combination with one or more of the first through sixth aspects, the plurality of PSFCH transmissions in accordance with the repetition factor are associated with a HARQ-ACK feedback that includes one or more HARQ-ACK bits.

In an eighth aspect, alone or in combination with one or more of the first through sixth aspects, a PSFCH corresponding to the second PSSCH transmission is transmitted to the second UE at a same slot on different resource blocks from a repetition of a PSFCH for the first PSSCH transmission.

In a ninth aspect, alone or in combination with one or more of the first through sixth aspects, a priority associated with the second PSSCH transmission is not higher than a priority associated with the first PSSCH transmission.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
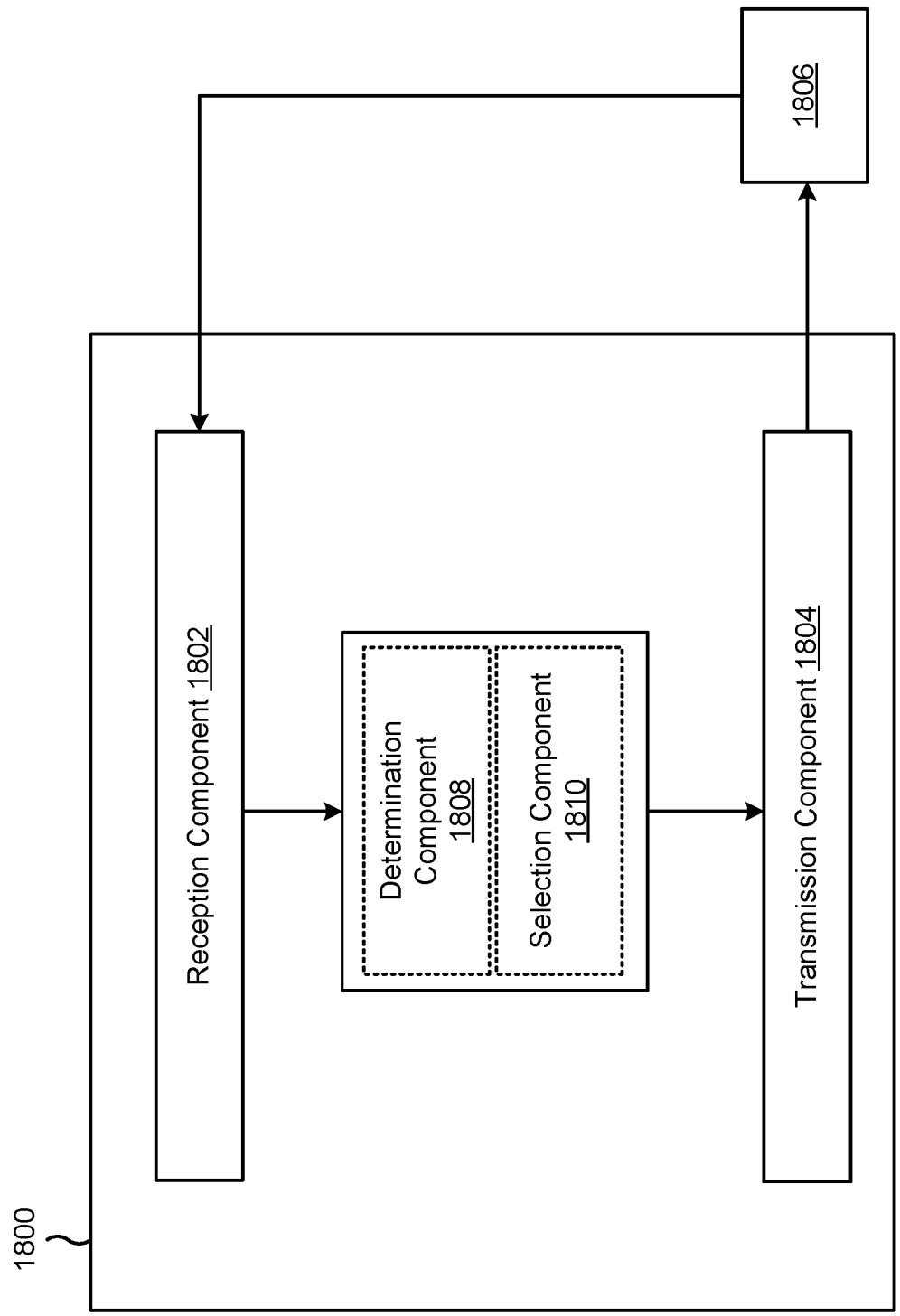
FIG. 18 is a block diagram of an example apparatus for wireless communication, in accordance with the present disclosure.

FIG. 18 is a block diagram of an example apparatus 1800 for wireless communication. The apparatus 1800 may be a first UE, or a first UE may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include one or more of a determination component 1808, or a selection component 1810, among other examples.

In some aspects, the apparatus 1800 may be configured to perform one or more operations described herein in connection with FIGS. 8-13. Additionally, or alternatively, the apparatus 1800 may be configured to perform one or more processes described herein, such as process 1400 of FIG. 14, process 1500 of FIG. 15, process 1600 of FIG. 16, process 1700 of FIG. 17, or a combination thereof. In some aspects, the apparatus 1800 and/or one or more components shown in FIG. 18 may include one or more components of the first UE described above in connection with FIG. 2. Additionally, or alternatively, one or more components shown in FIG. 18 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1806. In some aspects, the reception component 1802 may include one or more antennas, a demodulator, a MIMO detector, a receive processor, a controller/processor, a memory, or a combination thereof, of the first UE described above in connection with FIG. 2.

The transmission component 1804 may transmit communications, such as reference signals, control information, data communications, or a combination thereof, to the apparatus 1806. In some aspects, one or more other components of the apparatus 1806 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the first UE described above in connection with FIG. 2. In some aspects, the transmission component 1804 may be co-located with the reception component 1802 in a transceiver.

The reception component 1802 may receive, from a second UE, a sidelink communication via a sidelink channel between the first UE and the second UE. The transmission component 1804 may transmit, to the second UE and based at least in part on the sidelink communication, a PSFCH with a quantity of repetitions.

The determination component 1808 may determine the quantity of repetitions based at least in part on a number of information bits carried in the PSFCH. The reception component 1802 may receive, from a base station, a configuration that configures a plurality of thresholds for determining the quantity of repetitions based at least in part on the number of information bits carried in the PSFCH. The reception component 1802 may receive, from the second UE, sidelink control information that indicates the quantity of repetitions, wherein the sidelink control information is associated with a scheduling of the sidelink communication via the sidelink channel. The reception component 1802 may determine a configuration that indicates a periodicity associated with PSFCH transmissions and the quantity of repetitions.

The transmission component 1804 may transmit, to a second UE, a sidelink communication via a sidelink channel between the first UE and the second UE. The reception component 1802 may receive, from the second UE and based at least in part on the sidelink communication, a PSFCH with a quantity of repetitions.

The transmission component 1804 may transmit, to the second UE, sidelink control information that indicates the quantity of repetitions, wherein the sidelink control information is associated with a scheduling of the sidelink communication via the sidelink channel.

The transmission component 1804 may send, to a second UE, a first PSSCH transmission. The selection component 1810 may select, for a second PSSCH transmission, a PSSCH resource for which a corresponding PSFCH resource does not collide with one of a plurality of PSFCH transmissions in accordance with a repetition factor associated with the first PSSCH transmission. The transmission component 1804 may send, to the second UE, the second PSSCH transmission via the PSSCH resource.

The reception component 1802 may receive, from the second UE, the plurality of PSFCH transmissions in accordance with the repetition factor based at least in part on the first PSSCH transmission. The transmission component 1804 may send, to the second UE, the second PSSCH transmission based at least in part on receiving the plurality of PSFCH transmissions in accordance with the repetition factor from the second UE.

The reception component 1802 may receive, from a second UE, a first PSSCH transmission. The reception component 1802 may receive, from the second UE, a second PSSCH transmission via a PSSCH resource for which a corresponding PSFCH resource does not collide with one of a plurality of PSFCH transmissions in accordance with a repetition factor based at least in part on the first PSSCH transmission.

The transmission component 1804 may transmit, to the second UE, the plurality of PSFCH transmissions in accordance with the repetition factor based at least in part on the first PSSCH transmission. The reception component 1802 may receive, from the second UE, the second PSSCH transmission based at least in part on transmitting the plurality of PSFCH transmissions in accordance with the repetition factor to the second UE.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some Aspects of the present disclosure:

Aspect 1: A method of wireless communication performed by a first user equipment (UE), comprising: receiving, from a second UE, a sidelink communication via a sidelink channel between the first UE and the second UE; and transmitting, to the second UE and based at least in part on the sidelink communication, a physical sidelink feedback channel (PSFCH) with a quantity of repetitions.

Aspect 2: The method of Aspect 1, further comprising: determining the quantity of repetitions based at least in part on a number of information bits carried in the PSFCH.

Aspect 3: The method of Aspect 2, further comprising: determining a configuration for a plurality of thresholds; and determining the quantity of repetitions based at least in part on the plurality of thresholds.

Aspect 4: The method of any of Aspects 1 through 3, further comprising: receiving, from the second UE, sidelink control information that indicates the quantity of repetitions, wherein the sidelink control information is associated with a scheduling of the sidelink communication via the sidelink channel.

Aspect 5: The method of any of Aspects 1 through 4, wherein the quantity of repetitions is associated with a preconfigured repetition factor.

Aspect 6: The method of any of Aspects 1 through 5, wherein the PSFCH indicates one or more hybrid automatic repeat request acknowledgement (HARQ-ACK) bits, and further comprising: determining a configuration that indicates an association between the quantity of repetitions and a priority level of the one or more HARQ-ACK bits.

Aspect 7: The method of any of Aspects 1 through 6, wherein transmitting the PSFCH with the quantity of repetitions comprises transmitting the PSFCH with the quantity of repetitions in a single sidelink slot.

Aspect 8: The method of any of Aspects 1 through 7, wherein transmitting the PSFCH with the quantity of repetitions comprises transmitting the quantity of repetitions in a corresponding quantity of sidelink slots, where each repetition is transmitted in a respective sidelink slot.

Aspect 9: The method of any of Aspects 1 through 8, wherein transmitting the PSFCH with the quantity of repetitions comprises: transmitting the PSFCH with the quantity of repetitions in consecutive sidelink slots; or transmitting the PSFCH with the quantity of repetitions in consecutive sidelink slots that include PSFCH resources.

Aspect 10: The method of any of Aspects 1 through 9, wherein the PSFCH with the quantity of repetitions is associated with a first resource set and a PSFCH without repetition is associated with a second resource set that is different from the first resource set.

Aspect 11: The method of any of Aspects 1 through 10, wherein a slot for an initial PSFCH transmission is used to transmit a PSFCH without repetition, and a slot for a PSFCH repetition is not used for transmitting non-PSFCH repetitions.

Aspect 12: The method of any of Aspects 1 through 11, further comprising: determining a configuration that indicates a periodicity associated with PSFCH transmissions and the quantity of repetitions.

Aspect 13: The method of any of Aspects 1 through 12, wherein the PSFCH with the quantity of repetitions includes a first PSFCH transmission and a PSFCH repetition.

Aspect 14: The method of Aspect 13, wherein a same set of resource blocks is associated with the first PSFCH transmission and the PSFCH repetition.

Aspect 15: The method of Aspect 13, wherein a first set of resource blocks is associated with the first PSFCH transmission and a second set of resource blocks is associated with the PSFCH repetition.

Aspect 16: A method of wireless communication performed by a first user equipment (UE), comprising: transmitting, to a second UE, a sidelink communication via a sidelink channel between the first UE and the second UE; and receiving, from the second UE and based at least in part on the sidelink communication, a physical sidelink feedback channel (PSFCH) with a quantity of repetitions.

Aspect 17: The method of Aspect 16, wherein the quantity of repetitions is based at least in part on a number of information bits carried in the PSFCH.

Aspect 18: The method of any of Aspects 16 through 17, further comprising: transmitting, to the second UE, sidelink control information that indicates the quantity of repetitions, wherein the sidelink control information is associated with a scheduling of the sidelink communication via the sidelink channel.

Aspect 19: The method of any of Aspects 16 through 18, wherein the quantity of repetitions is associated with a preconfigured repetition factor.

Aspect 20: The method of any of Aspects 16 through 19, wherein the PSFCH indicates one or more hybrid automatic repeat request acknowledgement (HARQ-ACK) bits, and further comprising: determining a configuration that indicates an association between the quantity of repetitions and a priority level of the one or more HARQ-ACK bits.

Aspect 21: The method of any of Aspects 16 through 20, wherein receiving the PSFCH with the quantity of repetitions comprises receiving the PSFCH with the quantity of repetitions in a single sidelink slot.

Aspect 22: The method of any of Aspects 16 through 21, wherein receiving the PSFCH with the quantity of repetitions comprises receiving the quantity of repetitions in a corresponding quantity of sidelink slots, where each repetition is received in a respective sidelink slot.

Aspect 23: The method of any of Aspects 16 through 22, wherein receiving the PSFCH with the quantity of repetitions comprises receiving the PSFCH with the quantity of repetitions in consecutive sidelink slots.

Aspect 24: The method of any of Aspects 16 through 23, wherein receiving the PSFCH with the quantity of repetitions comprises receiving the PSFCH with the quantity of repetitions in consecutive sidelink slots that include PSFCH resources.

Aspect 25: The method of any of Aspects 16 through 24, wherein the PSFCH with the quantity of repetitions is associated with a first resource set and a PSFCH without repetition are associated with a second resource set that is different from the first resource set, and wherein a slot for an initial PSFCH transmission is used to transmit the PSFCH without repetition, and a slot for a PSFCH repetition is not used for transmitting non-PSFCH repetitions.

Aspect 26: The method of any of Aspects 16 through 25, wherein the PSFCH with the quantity of repetitions includes a first PSFCH transmission and a PSFCH repetition.

Aspect 27: The method of Aspect 26, wherein a same set of resource blocks is associated with the first PSFCH transmission and the PSFCH repetition.

Aspect 28: The method of Aspect 26, wherein a first set of resource blocks is associated with the first PSFCH transmission and a second set of resource blocks is associated with the PSFCH repetition.

Aspect 29: A method of wireless communication performed by a first user equipment (UE), comprising: sending, to a second UE, a first physical sidelink shared channel (PSSCH) transmission; selecting, for a second PSSCH transmission, a PSSCH resource for which a corresponding physical sidelink feedback channel (PSFCH) resource does not collide with one of a plurality of PSFCH transmissions in accordance with a repetition factor associated with the first PSSCH transmission; and sending, to the second UE, the second PSSCH transmission via the PSSCH resource.

Aspect 30: The method of Aspect 29, further comprising: receiving, from the second UE, the plurality of PSFCH transmissions in accordance with the repetition factor based at least in part on the first PSSCH transmission.

Aspect 31: The method of any of Aspects 29 through 30, further comprising: sending, to the second UE, the second PSSCH transmission based at least in part on receiving the plurality of PSFCH transmissions in accordance with the repetition factor from the second UE.

Aspect 32: The method of any of Aspects 29 through 31, wherein the second PSSCH transmission is performed after the plurality of PSFCH transmissions are received from the second UE based at least in part on the first PSSCH transmission.

Aspect 33: The method of any of Aspects 29 through 32, wherein the first PSSCH transmission and the second PSSCH transmission are associated with a single resource pool.

Aspect 34: The method of any of Aspects 29 through 33, wherein the first PSSCH transmission is associated with a first resource pool, and further comprising: sending, to the second UE, the second PSSCH transmission associated with a second resource pool irrespective of whether a plurality of PSFCH transmissions in accordance with a repetition factor are received from the second UE based at least in part on the first PSSCH transmission.

Aspect 35: The method of any of Aspects 29 through 34, wherein a quantity of PSSCH resources map to a PSFCH slot based at least in part on a periodicity associated with the PSFCH slot.

Aspect 36: The method of any of Aspects 29 through 35, wherein the plurality of PSFCH transmissions in accordance with the repetition factor are associated with a hybrid automatic repeat request acknowledgement (HARQ-ACK) feedback that includes one or more HARQ-ACK bits.

Aspect 37: The method of any of Aspects 29 through 36, wherein a PSFCH corresponding to the second PSSCH transmission is transmitted by the second UE at a same slot on different resource blocks from a repetition of a PSFCH for the first PSSCH transmission.

Aspect 38: The method of any of Aspects 29 through 37, wherein a priority associated with the second PSSCH transmission is not higher than a priority associated with the first PSSCH transmission.

Aspect 39: A method of wireless communication performed by a first user equipment (UE), comprising: receiving, from a second UE, a first physical sidelink shared channel (PSSCH) transmission; and receiving, from the second UE, a second PSSCH transmission via a PSSCH resource for which a corresponding physical sidelink feedback channel (PSFCH) resource does not collide with one of a plurality of PSFCH transmissions in accordance with a repetition factor based at least in part on the first PSSCH transmission.

Aspect 40: The method of Aspect 39, further comprising: transmitting, to the second UE, the plurality of PSFCH transmissions in accordance with the repetition factor based at least in part on the first PSSCH transmission.

Aspect 41: The method of any of Aspects 39 through 40, further comprising: receiving, from the second UE, the second PSSCH transmission based at least in part on transmitting the plurality of PSFCH transmissions in accordance with the repetition factor to the second UE.

Aspect 42: The method of any of Aspects 39 through 41, wherein the second PSSCH transmission is received after the plurality of PSFCH transmissions are transmitted to the second UE based at least in part on the first PSSCH transmission.

Aspect 43: The method of any of Aspects 39 through 42, wherein the first PSSCH transmission and the second PSSCH transmission are associated with a single resource pool.

Aspect 44: The method of any of Aspects 39 through 43, wherein the first PSSCH transmission is associated with a first resource pool, and further comprising: receiving, from the second UE, the second PSSCH transmission associated with a second resource pool irrespective of whether a plurality of PSFCH transmissions in accordance with a repetition factor are transmitted to the second UE based at least in part on the first PSSCH transmission.

Aspect 45: The method of any of Aspects 39 through 44, wherein a quantity of PSSCH resources map to a PSFCH slot based at least in part on a periodicity associated with the PSFCH slot.

Aspect 46: The method of any of Aspects 39 through 45, wherein the plurality of PSFCH transmissions in accordance with the repetition factor are associated with a hybrid automatic repeat request acknowledgement (HARQ-ACK) feedback that includes one or more HARQ-ACK bits.

Aspect 47: The method of any of Aspects 39 through 46, wherein a PSFCH corresponding to the second PSSCH transmission is transmitted by the second UE at a same slot on different resource blocks from a repetition of a PSFCH for the first PSSCH transmission.

Aspect 48: The method of any of Aspects 39 through 47, wherein a priority associated with the second PSSCH transmission is not higher than a priority associated with the first PSSCH transmission.

Aspect 49: An apparatus for wireless communication at a device, comprising a processor; memory coupled with the processor; and instructions stored in the memory and executable by the processor to cause the apparatus to perform the method of one or more Aspects of Aspects 1-15.

Aspect 50: A device for wireless communication, comprising a memory and one or more processors coupled to the memory, the memory and the one or more processors configured to perform the method of one or more Aspects of Aspects 1-15.

Aspect 51: An apparatus for wireless communication, comprising at least one means for performing the method of one or more Aspects of Aspects 1-15.

Aspect 52: A non-transitory computer-readable medium storing code for wireless communication, the code comprising instructions executable by a processor to perform the method of one or more Aspects of Aspects 1-15.

Aspect 53: A non-transitory computer-readable medium storing a set of instructions for wireless communication, the set of instructions comprising one or more instructions that, when executed by one or more processors of a device, cause the device to perform the method of one or more Aspects of Aspects 1-15.

Aspect 54: An apparatus for wireless communication at a device, comprising a processor; memory coupled with the processor; and instructions stored in the memory and executable by the processor to cause the apparatus to perform the method of one or more Aspects of Aspects 16-28.

Aspect 55: A device for wireless communication, comprising a memory and one or more processors coupled to the memory, the memory and the one or more processors configured to perform the method of one or more Aspects of Aspects 16-28.

Aspect 56: An apparatus for wireless communication, comprising at least one means for performing the method of one or more Aspects of Aspects 16-28.

Aspect 57: A non-transitory computer-readable medium storing code for wireless communication, the code comprising instructions executable by a processor to perform the method of one or more Aspects of Aspects 16-28.

Aspect 58: A non-transitory computer-readable medium storing a set of instructions for wireless communication, the set of instructions comprising one or more instructions that, when executed by one or more processors of a device, cause the device to perform the method of one or more Aspects of Aspects 16-28.

Aspect 59: An apparatus for wireless communication at a device, comprising a processor; memory coupled with the processor; and instructions stored in the memory and executable by the processor to cause the apparatus to perform the method of one or more Aspects of Aspects 29-38.

Aspect 60: A device for wireless communication, comprising a memory and one or more processors coupled to the memory, the memory and the one or more processors configured to perform the method of one or more Aspects of Aspects 29-38.

Aspect 61: An apparatus for wireless communication, comprising at least one means for performing the method of one or more Aspects of Aspects 29-38.

Aspect 62: A non-transitory computer-readable medium storing code for wireless communication, the code comprising instructions executable by a processor to perform the method of one or more Aspects of Aspects 29-38.

Aspect 63: A non-transitory computer-readable medium storing a set of instructions for wireless communication, the set of instructions comprising one or more instructions that, when executed by one or more processors of a device, cause the device to perform the method of one or more Aspects of Aspects 29-38.

Aspect 64: An apparatus for wireless communication at a device, comprising a processor; memory coupled with the processor; and instructions stored in the memory and executable by the processor to cause the apparatus to perform the method of one or more Aspects of Aspects 39-48.

Aspect 65: A device for wireless communication, comprising a memory and one or more processors coupled to the memory, the memory and the one or more processors configured to perform the method of one or more Aspects of Aspects 39-48.

Aspect 66: An apparatus for wireless communication, comprising at least one means for performing the method of one or more Aspects of Aspects 39-48.

Aspect 67: A non-transitory computer-readable medium storing code for wireless communication, the code comprising instructions executable by a processor to perform the method of one or more Aspects of Aspects 39-48.

Aspect 68: A non-transitory computer-readable medium storing a set of instructions for wireless communication, the set of instructions comprising one or more instructions that, when executed by one or more processors of a device, cause the device to perform the method of one or more Aspects of Aspects 39-48.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   sending, to a second UE, a first physical sidelink shared channel (PSSCH) transmission;
   selecting, for a second PSSCH transmission, a physical sidelink shared channel (PSSCH) resource for which a corresponding physical sidelink feedback channel (PSFCH) resource does not collide with one of a plurality of PSFCH transmissions in accordance with a repetition factor associated with the first PSSCH transmission; and
   sending, to the second UE, the second PSSCH transmission via the PSSCH resource.

2. The method of claim 1, further comprising:
   receiving, from the second UE, the plurality of PSFCH transmissions in accordance with the repetition factor based at least in part on the first PSSCH transmission.

3. The method of claim 1, further comprising:
   sending, to the second UE, the second PSSCH transmission based at least in part on receiving the plurality of PSFCH transmissions in accordance with the repetition factor from the second UE.

4. The method of claim 1, wherein the second PSSCH transmission is performed after the plurality of PSFCH transmissions are received from the second UE based at least in part on the first PSSCH transmission.

5. The method of claim 1, wherein the first PSSCH transmission and the second PSSCH transmission are associated with a single resource pool.

6. The method of claim 1, wherein the first PSSCH transmission is associated with a first resource pool, and further comprising:
   sending, to the second UE, the second PSSCH transmission associated with a second resource pool irrespective of whether the plurality of PSFCH transmissions in accordance with the repetition factor are received from the second UE based at least in part on the first PSSCH transmission.

7. The method of claim 1, wherein a quantity of PSSCH resources map to a PSFCH slot based at least in part on a periodicity associated with the PSFCH slot.

8. The method of claim 1, wherein the plurality of PSFCH transmissions in accordance with the repetition factor are associated with a hybrid automatic repeat request acknowledgement (HARQ-ACK) feedback that includes one or more HARQ-ACK bits.

9. The method of claim 1, wherein a PSFCH corresponding to the second PSSCH transmission is transmitted by the second UE at a same slot on different resource blocks from a repetition of a PSFCH for the first PSSCH transmission.

10. The method of claim 1, wherein a priority associated with the second PSSCH transmission is not higher than a priority associated with the first PSSCH transmission.

11. A method of wireless communication performed by a first user equipment (UE), comprising:
    receiving, from a second UE, a first physical sidelink shared channel (PSSCH) transmission; and
    receiving, from the second UE, a second PSSCH transmission via a PSSCH resource for which a corresponding physical sidelink feedback channel (PSFCH) resource does not collide with one of a plurality of PSFCH transmissions in accordance with a repetition factor based at least in part on the first PSSCH transmission.

12. The method of claim 11, further comprising:
    transmitting, to the second UE, the plurality of PSFCH transmissions in accordance with the repetition factor based at least in part on the first PSSCH transmission.

13. The method of claim 11, further comprising:
    receiving, from the second UE, the second PSSCH transmission based at least in part on transmitting the plurality of PSFCH transmissions in accordance with the repetition factor to the second UE.

14. The method of claim 11, wherein the second PSSCH transmission is received after the plurality of PSFCH transmissions are transmitted to the second UE based at least in part on the first PSSCH transmission.

15. The method of claim 11, wherein the first PSSCH transmission and the second PSSCH transmission are associated with a single resource pool.

16. The method of claim 11, wherein the first PSSCH transmission is associated with a first resource pool, and further comprising:
    receiving, from the second UE, the second PSSCH transmission associated with a second resource pool irrespective of whether the plurality of PSFCH transmissions in accordance with the repetition factor are transmitted to the second UE based at least in part on the first PSSCH transmission.

17. The method of claim 11, wherein a quantity of PSSCH resources map to a PSFCH slot based at least in part on a periodicity associated with the PSFCH slot.

18. The method of claim 11, wherein the plurality of PSFCH transmissions in accordance with the repetition factor are associated with a hybrid automatic repeat request acknowledgement (HARQ-ACK) feedback that includes one or more HARQ-ACK bits.

19. The method of claim 11, wherein a PSFCH corresponding to the second PSSCH transmission is transmitted to the second UE at a same slot on different resource blocks from a repetition of a PSFCH for the first PSSCH transmission.

20. The method of claim 11, wherein a priority associated with the second PSSCH transmission is not higher than a priority associated with the first PSSCH transmission.

21. A first user equipment (UE) for wireless communication, comprising:
    a memory; and
    one or more processors operatively coupled to the memory, the memory and the one or more processors configured to:
      send, to a second UE, a first physical sidelink shared channel (PSSCH) transmission;
      select, for a second PSSCH transmission, a PSSCH resource for which a corresponding physical sidelink feedback channel (PSFCH) resource does not collide with one of a plurality of PSFCH transmissions in accordance with a repetition factor associated with the first PSSCH transmission; and send, to the second UE, the second PSSCH transmission via the PSSCH resource.

22. The first UE of claim 21, wherein the memory and the one or more processors are further configured to:

receive, from the second UE, the plurality of PSFCH transmissions in accordance with the repetition factor based at least in part on the first PSSCH transmission.

23. The first UE of claim 21, wherein the memory and the one or more processors are further configured to:

send, to the second UE, the second PSSCH transmission based at least in part on receiving the plurality of PSFCH transmissions in accordance with the repetition factor from the second UE.

24. The first UE of claim 21, wherein the second PSSCH transmission is performed after the plurality of PSFCH transmissions are received from the second UE based at least in part on the first PSSCH transmission.

25. The first UE of claim 24, wherein the memory and the one or more processors are further configured to:

transmit, to the second UE, the plurality of PSFCH transmissions in accordance with the repetition factor based at least in part on the first PSSCH transmission.

26. The first UE of claim 21, wherein the first PSSCH transmission is associated with a first resource pool, and wherein the memory and the one or more processors are further configured to:

send, to the second UE, the second PSSCH transmission associated with a second resource pool irrespective of whether the plurality of PSFCH transmissions in accordance with the repetition factor are received from the second UE based at least in part on the first PSSCH transmission.

27. A first user equipment (UE) for wireless communication, comprising:

a memory; and one or more processors operatively coupled to the memory, the memory and the one or more processors configured to:

receive, from a second UE, a first physical sidelink shared channel (PSSCH) transmission; and receive, from the second UE, a second PSSCH transmission via a PSSCH resource for which a corresponding physical sidelink feedback channel (PSFCH) resource does not collide with one of a plurality of PSFCH transmissions in accordance with a repetition factor based at least in part on the first PSSCH transmission.

28. The first UE of claim 27, wherein the memory and the one or more processors are further configured to:

receive, from the second UE, the second PSSCH transmission based at least in part on transmitting the plurality of PSFCH transmissions in accordance with the repetition factor to the second UE.

29. The first UE of claim 27, wherein the second PSSCH transmission is received after the plurality of PSFCH transmissions are transmitted to the second UE based at least in part on the first PSSCH transmission.

30. The first UE of claim 27, wherein the first PSSCH transmission is associated with a first resource pool, and wherein the memory and the one or more processors are further configured to: receive, from the second UE, the second PSSCH transmission associated with a second resource pool irrespective of whether the plurality of PSFCH transmissions in accordance with the repetition factor are transmitted to the second UE based at least in part on the first PSSCH transmission.

* * * * *